US008479096B2

(12) United States Patent
Terada et al.

(10) Patent No.: US 8,479,096 B2
(45) Date of Patent: Jul. 2, 2013

(54) CONTENT DISPLAY DEVICE, TELEVISION RECEIVER, CONTENT DISPLAY METHOD, CONTENT DISPLAY CONTROL PROGRAM, AND RECORDING MEDIUM

(75) Inventors: Satoshi Terada, Osaka (JP); Ryouta Yagi, Osaka (JP); Takanobu Matsubara, Osaka (JP); Kazuhiro Saiki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 576 days.

(21) Appl. No.: 12/526,987

(22) PCT Filed: Feb. 14, 2008

(86) PCT No.: PCT/JP2008/052466
§ 371 (c)(1),
(2), (4) Date: Aug. 13, 2009

(87) PCT Pub. No.: WO2008/099897
PCT Pub. Date: Aug. 21, 2008

(65) Prior Publication Data
US 2010/0122162 A1    May 13, 2010

(30) Foreign Application Priority Data
Feb. 16, 2007    (JP) .................................. 2007-037173

(51) Int. Cl.
*G06F 3/01*    (2006.01)
(52) U.S. Cl.
USPC ........................................................ 715/702
(58) Field of Classification Search
USPC ........................................................ 715/702
See application file for complete search history.

(56) References Cited

U.S. PATENT DOCUMENTS 5,559,549 A    9/1996    Hendricks et al.
5,600,364 A    2/1997    Hendricks et al.
(Continued)

FOREIGN PATENT DOCUMENTS

CN    1155236 C    6/2004
EP    1 176 817 A2    1/2002
(Continued)

OTHER PUBLICATIONS

Office Action for co-pending U.S. Appl. No. 12/089,183, Jan. 13, 2011.

(Continued)

*Primary Examiner* — William Bashore
*Assistant Examiner* — Hien Duong
(74) *Attorney, Agent, or Firm* — Birch, Stewart, Kolasch & Birch, LLP

(57) ABSTRACT

A content display device for displaying content items on a screen includes: an operation instruction receiving section (70*d*) for receiving, from a user, a switching instruction to switch the content items; a content list analyzing and choosing section (40) for, based on an order prescribed in a content list, choosing a content item that is displayed on the screen, in accordance with the switching instruction received by the operation instruction receiving section (70*d*); and a content acquisition and display section for causing the content item chosen by the content choosing section (40) to be displayed on the screen. This provides a content display device whose operationality has been improved by comprehensively optimizing a user's content browsing operation from the viewpoint of regarding, as a series of operations, access to the URL of a desired content item and an operation for controlling the display range of a displayed content item.

17 Claims, 27 Drawing Sheets

U.S. PATENT DOCUMENTS

| | | | |
|---|---|---|---|
| 5,600,573 A | 2/1997 | Hendricks et al. | |
| 5,659,350 A | 8/1997 | Hendricks et al. | |
| 5,682,195 A | 10/1997 | Hendricks et al. | |
| 5,734,853 A | 3/1998 | Hendricks et al. | |
| 5,798,785 A | 8/1998 | Hendricks et al. | |
| 5,986,690 A | 11/1999 | Hendricks | |
| 5,990,883 A | 11/1999 | Byrne et al. | |
| 5,990,927 A | 11/1999 | Hendricks et al. | |
| 6,052,554 A | 4/2000 | Hendricks et al. | |
| 6,160,989 A | 12/2000 | Hendricks et al. | |
| 6,175,362 B1 | 1/2001 | Harms et al. | |
| 6,181,335 B1 | 1/2001 | Hendricks et al. | |
| 6,201,536 B1 | 3/2001 | Hendricks et al. | |
| 6,374,177 B1 | 4/2002 | Lee et al. | |
| 6,408,437 B1 | 6/2002 | Hendricks et al. | |
| 6,463,585 B1 | 10/2002 | Hendricks et al. | |
| 6,515,680 B1 | 2/2003 | Hendricks et al. | |
| 6,539,548 B1 | 3/2003 | Hendricks et al. | |
| 6,557,173 B1 | 4/2003 | Hendricks | |
| 6,690,391 B1 | 2/2004 | Proehl et al. | |
| 6,725,022 B1 | 4/2004 | Clayton et al. | |
| 6,728,531 B1 | 4/2004 | Lee et al. | |
| 6,738,978 B1 | 5/2004 | Hendricks et al. | |
| 6,799,201 B1 | 9/2004 | Lee et al. | |
| 6,828,993 B1 | 12/2004 | Hendricks et al. | |
| 6,829,475 B1 | 12/2004 | Lee et al. | |
| 7,013,478 B1 | 3/2006 | Hendricks et al. | |
| 7,017,178 B1 | 3/2006 | Hendricks et al. | |
| 7,073,187 B1 | 7/2006 | Hendricks et al. | |
| 7,134,131 B1 | 11/2006 | Hendricks et al. | |
| 7,168,084 B1 | 1/2007 | Hendricks et al. | |
| 7,207,053 B1 | 4/2007 | Asmussen | |
| 7,207,055 B1 | 4/2007 | Hendricks et al. | |
| 7,260,829 B1 | 8/2007 | Hendricks et al. | |
| 7,269,841 B1 | 9/2007 | Hendricks et al. | |
| 7,298,851 B1 | 11/2007 | Hendricks et al. | |
| 2001/0022839 A1 | 9/2001 | Ishigaki | |
| 2002/0040471 A1 | 4/2002 | Hendricks | |
| 2002/0040472 A1 | 4/2002 | Hendricks | |
| 2002/0040473 A1 | 4/2002 | Hendricks | |
| 2002/0042923 A1 | 4/2002 | Asmussen et al. | |
| 2002/0042925 A1 | 4/2002 | Ebisu et al. | |
| 2002/0104083 A1 | 8/2002 | Hendricks et al. | |
| 2002/0112249 A1 | 8/2002 | Hendricks et al. | |
| 2002/0144289 A1 | 10/2002 | Taguchi et al. | |
| 2002/0196268 A1 | 12/2002 | Wolff et al. | |
| 2002/0196364 A1 | 12/2002 | Hendricks | |
| 2003/0117445 A1 | 6/2003 | Hendricks et al. | |
| 2003/0145323 A1 | 7/2003 | Hendricks et al. | |
| 2003/0153992 A1 | 8/2003 | Maruyama et al. | |
| 2003/0234804 A1 | 12/2003 | Parker et al. | |
| 2004/0111742 A1 | 6/2004 | Hendricks et al. | |
| 2004/0135819 A1* | 7/2004 | Maa | 345/840 |
| 2004/0174390 A1* | 9/2004 | Shah | 345/700 |
| 2004/0187149 A1 | 9/2004 | Halgas, Jr. | |
| 2004/0268413 A1 | 12/2004 | Reid et al. | |
| 2005/0154988 A1 | 7/2005 | Proehl et al. | |
| 2005/0157217 A1 | 7/2005 | Hendricks | |
| 2005/0273833 A1 | 12/2005 | Soinio | |
| 2006/0150094 A1* | 7/2006 | Patrawala | 715/520 |
| 2006/0218608 A1 | 9/2006 | Miura et al. | |
| 2006/0253874 A1* | 11/2006 | Stark et al. | 725/62 |
| 2007/0016923 A1 | 1/2007 | Kwon | |
| 2007/0183430 A1 | 8/2007 | Asmussen | |
| 2007/0201702 A1 | 8/2007 | Hendricks et al. | |
| 2007/0277201 A1 | 11/2007 | Wong et al. | |
| 2009/0210791 A1 | 8/2009 | Proehl et al. | |
| 2009/0210792 A1 | 8/2009 | Proehl et al. | |

FOREIGN PATENT DOCUMENTS

| | | |
|---|---|---|
| EP | 1 947 855 A1 | 7/2008 |
| JP | 4-44475 A | 2/1992 |
| JP | 7-288795 A | 10/1995 |
| JP | 8-506941 A | 7/1996 |
| JP | 9-83891 A | 3/1997 |
| JP | 10-307838 A | 11/1998 |
| JP | 2000-287179 A | 10/2000 |
| JP | 2000-305836 A | 11/2000 |
| JP | 2001-117692 A | 4/2001 |
| JP | 2001-134530 A | 5/2001 |
| JP | 2001-245351 A | 9/2001 |
| JP | 2001-290731 A | 10/2001 |
| JP | 2002-44536 A | 2/2002 |
| JP | 2002-82746 A | 3/2002 |
| JP | 2002-190992 A | 7/2002 |
| JP | 2002-297486 A | 10/2002 |
| JP | 2003-23576 A | 1/2003 |
| JP | 2003-122490 A | 4/2003 |
| JP | 2003-526971 A | 9/2003 |
| JP | 2004-21326 A | 1/2004 |
| JP | 2005-33699 A | 2/2005 |
| JP | 2005-45592 A | 2/2005 |
| KR | 2006-0033078 A | 4/2006 |
| WO | WO 94/14282 A1 | 6/1994 |
| WO | WO 01/22712 A1 | 3/2001 |
| WO | WO 2005/084023 A1 | 9/2005 |

OTHER PUBLICATIONS

Office Action for co-pending U.S. Appl. No. 12/089,182; dated Apr. 12, 2011.

Junko Kuramochi et al. "Proposed Interface, Application of User Motivating Factors" Compilation of Submitted Papers for 23rd Conference, Japan Cognitive Science Society Published on May 20, 2006. Presented in the Conference on Aug. 2, 2006, pp. 76-81.

Office Action for co-pending U.S. Appl. No. 12/089,183, dated Sep. 2, 2010.

Search Report for European Patent Application No. 06811457.8 dated Aug. 2, 2010 issued in European application corresponding to co-pending U.S. Appl. No. 12/089,183.

Search Report for corresponding European Patent Application No. 06811457.8 dated Aug. 2, 2010.

Office Action for co-pending U.S. Appl. No. 12/089,183 dated Sep. 30, 2011.

Shinji Shiota, Windows 98 de hajimeru kajteki internetto Katsuyouhen (Start Comfortable Internet with Windows 98, Applications) Internet ASCII, vol. 3, #10, pp. 160, ASCII Corporation, Japan, Oct. 1998.

WWW Brauza Shinjidai! Korede wakaru Internet Explorer 4.0 & Netscape Communicator 4.0, (New Era of WWW Browser! Guide to Understanding Internet Explorer 4.0 & Netscape Communicator 4.0), PC WORK! vol. 4, #11, pp. 126, Mainichi Communications Japan, Nov. 18, 1997.

* cited by examiner

RED

BLUE

CONTENT DISPLAY DEVICE, TELEVISION RECEIVER, CONTENT DISPLAY METHOD, CONTENT DISPLAY CONTROL PROGRAM, AND RECORDING MEDIUM

TECHNICAL FIELD

The present invention relates to content display devices and, in particular, to designating the URL of a content item and controlling the display range of a content item being displayed.

BACKGROUND ART

Conventionally, personal computers have been taken as main examples of means for viewing or listening to content items, such as moving images, pieces of music, voices, and still images, described in description languages, such as HTML (hypertext markup language), SVG (scalable vector graphics), SMIL (synchronized multimedia integration language), and FLASH, on the Internet and the like. A user accesses his/her desired content item by inputting the URL (uniform resource locator) address of the content item directly to a browser by an internet browser application program, and browses the content item by operating the browser.

The access can be simplified by the user's accessing a so-called portal site on the Internet and choosing, with use of an input device such as a mouse, a hyperlink in the portal site that will take him/her to the content item if he/she clicks on it.

Alternatively, the user can simplify the access by choosing a URL address, in accessing his/her desired content item, from among a plurality of URL addresses saved as "favorite" in his/her client terminal.

Patent Literature 1 discloses a technique for improving the operationality with which to view or listen to content items. According to this technique, a client's display has a fixed display area, provided on the lower side thereof, in which paging buttons are displayed. When a user chooses any one of the paging buttons with a mouse or the like, a URL is read out from a bookmark file under a procedure according to the type of the paging button chosen, and hypertext information corresponding to the URL is accessed. Such a button display allows the user to move a cursor less to choose one URL from among URLs stored in a bookmark file. That is, the user can access his/her desired content item by operating the paging buttons.

Further, Patent Literature 2 discloses a technique by which, while a user is browsing the contents of his/her desired content item that he/she has accessed, the user easily gives instructions for controlling the display range such as switching from one page to another in the content item being displayed or scrolling through the content item being displayed.

According to this technique, a display section displays a screen for an operation mode. Next, it is judged whether or not a warp key (browser function key) has been pressed in displaying, by scrolling, a portion that is not being displayed on the current screen. If the warp key (browser function key) has been pressed, a change in scrolling mode is made. If the warp key (browser function key) has not been pressed, the current scrolling mode is maintained. Examples of variations in scrolling mode are a line-by-line scrolling mode and a page-by-page scrolling mode. That is, the display range is controlled, for example, by varying the extent of content scrolling with an input device and buttons provided by a browser application program.

In recent years, various home appliances such as portable phones, mobile terminals, and television receivers, as well as personal computers, have been used to connect to the Internet, thus making it possible to view or listen to content items on the Internet. This creates a demand for an operationality-improving technique that can be applied to devices having no general-purpose input means such as mouses.

CITATION LIST

Patent Literature 1
Japanese Patent Application Publication, Tokukaihei, No. 10-307838 A (Publication Date: Nov. 17, 1998)
Patent Literature 2
Japanese Patent Application Publication, Tokukai, No. 2001-245351 A (Publication Date: Sep. 7, 2001)

SUMMARY OF INVENTION

However, such a conventional method for accessing a desired content item requires a user to take the trouble in inputting a character string from a keyboard, or to take the trouble in seeing his/her desired hyperlink in a content item being displayed, pointing a mouse cursor to the hyperlink, and choosing the hyperlink by clicking on it.

For example, the technique of Patent Literature 1 uses a bookmark file in which the URL of a content item has been registered, thereby eliminating the need to input a character string or click on a hyperlink with a mouse. However, unfortunately, the technique requires a user to take trouble in seeing one of a plurality of paging buttons displayed on a screen, pointing a mouse cursor to the paging button, and choosing the button by clicking on it. It should be noted that Patent Literature 1 does not teach anything about controlling the display range of a content item displayed on the screen.

Further, the technique of Patent Literature 2 can switch between line-by-line scrolling and page-by-page scrolling. However, Patent Literature 2 does not teach a technique for improving the operationality with which a user accesses his/her desired content item. That is, since the user designates the URL of his/her desired content item by a conventional technique, the user is required to take the trouble in an operation for designating the URL.

The techniques of Patent Literatures 1 and 2 are techniques for improving the operationality with which to access an URL and the operationality with which to control the display range of a content item being displayed, respectively. However, a user's content browsing action, i.e., an action that the user does in order to access the URL of his/her desired content item first and then control the display range in browsing the displayed content item, is not comprehensively optimized from the viewpoint of regarding the action as a series of operations. That is, even if the techniques of Patent Literatures 1 and 2 are combined, such a combination merely results in an increase in the number of buttons that are to be operated, and as such, cannot provide a user with an improvement in operationality as a series of operations for browsing a content item.

The present invention has been made in view of the foregoing problems, and it is an object of the present invention to provide a content display device whose operationality has been improved by comprehensively optimizing a user's content browsing action from the viewpoint of regarding, as a series of operations, access to the URL of a desired content item and an operation for controlling the display range of a displayed content item.

(1) In order to solve the foregoing problems, a content display device according to the present invention is a content display device for displaying content items on a screen, including: content switching instruction receiving means for receiving, by a user's operation, a switching instruction to switch the content items; content choosing means for, based on an order prescribed in a content list, choosing a content item that is displayed on the screen, in accordance with the switching instruction received by the content switching instruction receiving means; and content display means for causing the content item chosen by the content choosing means to be displayed on the screen.

The content switching instruction receiving means is realized, for example, as a wheel capable of a rotating operation. In switching the currently displayed content item, the user puts his/her finger on the wheel and performs an operation of rotating the wheel. The user needs to see the wheel in putting his/her finger on the wheel at the beginning of the operation. However, once the user has put his/her finger on the wheel, the user does not need to transfer his/her gaze from the currently displayed content item to the wheel to see the wheel in switching the content items. In accordance with a content switching instruction received by the content switching instruction receiving means, the content choosing means chooses a next content item in the content list. Then, the content display means displays the chosen content item on the screen.

The foregoing arrangement eliminates the need for a user to transfer his/her gaze to see and operate content switching instruction receiving means in giving a content switching instruction, thus bringing about an effect of enabling an improvement in the operationality of the content display device.

(2) Further, in addition to the foregoing arrangement, the content display device according to the present invention is characterized in that the content list is a list whose entries are identifiers of the content items and descriptors of locations holding the content items.

In this arrangement, the identifiers of the content items are, for example, content names. Further, the descriptors of the locations holding the content items are, for example, URLs. Further, examples of the order encompass an order defined by a user and a sort by category or the like.

(3) Further, in addition to the foregoing arrangement, the content display device according to the present invention is characterized in that the prescribed order is an order in which the entries are written.

(4) Further, in addition to the foregoing arrangement, the content display device according to the present invention further includes content list display means for displaying at least a part of the content list, the at least a part of the content list containing an identifier of a currently displayed content item.

In this arrangement, the content list display means causes the at least a part of the content list to be displayed as a content list window on a part of the screen on which the chosen content item is being displayed. For example, in the content list window, the content name of the currently displayed content item and the content names content items written above and below the currently displayed content item, i.e., the content names of content items either of which is displayed next in response to a content switching instruction from the user may be displayed as the identifiers.

The foregoing arrangement brings about an effect of enabling a user to identify the currently displayed content item by the identifier of another content item and to know what content item is displayed when he/she next gives a content switching instruction.

(5) Further, in addition to the foregoing arrangement, the content display device according to the present invention is characterized in that the content list display means displays the at least a part of the content list on the screen when the content switching instruction receiving section receives the switching instruction.

In this arrangement, usually, the content list window, which is the at least a part of the content list, is not displayed on the screen, and the content list window is displayed on the screen at the time when the user gives an instruction to switch the content items.

The foregoing arrangement does not display the content list window on the screen until the user gives an switching instruction with the clear intention of switching the content items, thus bringing about an effect of preventing the content list window from hiding a part of the content item displayed on the screen.

(6) Further, in addition to the foregoing arrangement, the content display device according to the present invention further includes content list acquiring means for acquiring the content list from an external storage device in which the content list has been stored.

(7) Further, in addition to the foregoing arrangement, the content display device according to the present invention further includes: communication means for communicating with an external device; and content list acquiring means for acquiring the content list from the external device via the communication means.

(8) Further, in addition to the foregoing arrangement, the content display device according to the present invention further includes communication means for communicating with an external device, and is characterized in that the content display means acquires, from an external device via the communication means, the content item chosen by the content choosing means.

The foregoing arrangement allows the content display device to acquire and display a content item stored in an external device, thus bringing about an effect of enabling a user to browse the contents of a content item registered on a content list but stored in an external device.

(9) Further, in addition to the foregoing arrangement, the content display device according to the present invention is characterized in that in accordance with an order in which the content items are written in the content list and information on which of the content items in the content list is currently being displayed, the content display means acquires, in advance before the content switching instruction receiving means receives a next switching instruction from the user, a content item that is chosen by the content choosing means when the content switching instruction receiving means receives the next switching instruction.

In this arrangement, the content display means recognizes the order in which the content items are written in the content list and which of the content items in the content list is currently being displayed, and therefore can judge which of the content items is to be displayed next time a switching instruction comes from the user. Moreover, before a switching instruction comes from the user, the content display means looks ahead to a content item that is to be displayed next.

The foregoing arrangement allows the content display means to, prior to an instruction from the user to switch the content items, look ahead to a content item that is to be displayed next, thus bringing about an effect of displaying the next content item in quick response to the switching instruction from the user.

(10) Further, in addition to the foregoing arrangement, the content display device according to the present invention is characterized in that in displaying at least a part of the identifiers of the content items in the content list on the screen, the content list display means displays an identifier of a content item that has been acquired, together with an icon indicating completion of the acquisition.

The foregoing arrangement enables the user to know, before switching the content items, whether the content item to which he/she switches next has already been acquired, thus bringing about an effect of easing the discomfort of waiting until completion of content acquisition after giving a content switching instruction.

(11) Further, in addition to the foregoing arrangement, the content display device according to the present invention is characterized in that in displaying at least a part of the identifiers of the content items in the content list on the screen, the content list display means also displays a degree of completion of the acquisition of a content item whose identifier is displayed on the screen.

The foregoing arrangement enables the user to know, in switching the content items, how much the content item to which he/she switches next has been acquired, and to know the progress of the acquisition before switching the content items, thus bringing about an effect of easing the discomfort of waiting until completion of content acquisition after giving a content switching instruction.

(12) Further, the content display device according to the present invention is characterized in that after a certain period of time has elapsed since the content list display means displayed the content list or in accordance with input from the user, the content list display means changes from displaying the content list to displaying a title of the currently displayed content item.

According to the foregoing arrangement replaces the list display with the title display after a certain period of time because the list display hides most of the browser, thereby satisfying both of the list display and the viewability of the browser.

(13) Further, in addition to the foregoing arrangement, the content display device according to the present invention further includes slide-show mode setting means for receiving from the user an instruction to switch to a slide-show mode in which to change, at predetermined time intervals, from displaying one content item written in the content list to displaying another, and is characterized in that while the slide-show mode is being used, the content display means changes, at the predetermined time intervals, from displaying one content item written in the content list to displaying another, without an instruction from the content switching instruction receiving means.

The foregoing arrangement enables the content display means to switch the content items in sequence without an content switching instruction from the user, thus bringing about an effect of saving the user the trouble of giving an content switching instruction every time he/she browses the content items in sequence.

(14) Further, in addition to the foregoing arrangement, the content display device according to the present invention further includes: display range changing instruction receiving means, used concurrently as the content switching instruction receiving means, which receives from the user a display range changing instruction to change a display range of a content item; display range control means for controlling, in accordance with a display range changing instruction received by the display range changing instruction receiving means, a display range of a currently displayed content item; and control switching instruction receiving means for receiving a control switching instruction as to whether to switch an operation mode of the content display device to a scrolling mode in which to control the display range of the currently displayed content item or a content switching mode in which to control choice of the entries in the content list, and is characterized in that: the content switching instruction receiving means and the content display range changing instruction receiving means are used as each other; in the scrolling mode, the control switching instruction receiving means sends, to the display range control means, input from the content display range changing instruction receiving means; and in the content switching mode, the control switching instruction receiving means sends, to the content choosing means, input from the content switching instruction receiving means.

The foregoing arrangement make it possible to use, for example, a single wheel concurrently as the content switching instruction receiving means and the content display range changing instruction receiving means, thus bringing about an effect of avoiding wastefully providing separate devices as the content switching instruction receiving means and the content display range changing instruction receiving means.

(15) Further, in addition to the foregoing arrangement, the content display device according to the present invention is characterized in that the display range control means changes, in accordance with contents of the currently displayed content item, a way in which the display range is controlled.

In this arrangement, the phrase "changing the way in which the display range is controlled" means, for example, switching between line-by-line scrolling and half-page scrolling. For example, line-by-line scrolling is used when the type of content item is a diary site mostly containing characters. Half-page scrolling is used when the type of content item is a photograph site mostly containing still images. Page-by-page scrolling is used when the type of content item is a thumbnail of an animated content item.

The foregoing arrangement makes it possible to change, in accordance with the contents of the currently displayed content item, the way in which the display range is controlled, thus bringing about an effect of enabling an improvement in the operationality with which the user browses the content items.

(16) Further, in addition to the foregoing arrangement, the content display device according to the present invention is characterized in that the display range control means changes, in accordance with contents of the currently displayed content item, a display range that is to be controlled.

In this arrangement, the phrase "changing, in accordance with the contents of the currently displayed content, the display range that is to be controlled" means, for example, that full-screen scrolling is used when the currently displayed content item is a web page, and that when the currently displayed content item is a scheduler, scrolling is performed only on an area corresponding to the contents of the daily schedule.

The foregoing arrangement makes it possible to change, in accordance with the contents of the currently displayed content, the display range that is to be controlled, thus bringing about an effect of enabling an improvement in the operationality with which the user browses the content items.

(17) Further, in addition to the foregoing arrangement, the content display device according to the present invention is characterized in that the control switching instruction receiving means is a button provided separately from the content switching instruction receiving means.

(18) Further, in addition to the foregoing arrangement, the content display device according to the present invention is characterized in that: the content switching instruction receiving means, the display range changing instruction receiving means, and the control switching instruction receiving means are realized concurrently by a wheel capable of a rotating operation and a push operation; in the content switching mode, the wheel receives the rotating operation as input to the content choosing means; in the scrolling mode, the wheel receive the rotating operation as input to the display range control means and the push operation as input to the control switching instruction receiving means.

The foregoing arrangement uses, for example, a single wheel concurrently as the content switching instruction receiving means, the display range changing instruction receiving means, and the control switching instruction receiving means, thus bringing about an effect of avoiding waste. Further, the foregoing arrangement enables the user to give a switching instruction, a display range changing instruction, and a control switching instruction by putting his/her finger on the wheel, thus bringing about an effect of enabling an improvement in user-friendliness.

(19) Further, in addition to the foregoing arrangement, the content display device according to the present invention is characterized in that the control switching instruction receiving means is input from a touch sensor provided on the screen.

(20) Further, in addition to the foregoing arrangement, the content display device according to the present invention is characterized in that when in the scrolling mode the display range reaches an edge of the currently displayed content item and then a display range changing instruction to move the display range farther than the edge is inputted, the control switching instruction receiving means switches from the scrolling mode to the content switching mode in response to the display range changing instruction as a trigger.

The foregoing arrangement enables the user, after having finished browsing up to the edge of a content item, to move on quickly to choose another content item, thus bringing about an effect of enabling an improvement in the operationality with which the user browses a plurality of content items in series.

(21) Further, in addition to the foregoing arrangement, the content display device according to the present invention is characterized in that on the screen, a display corresponding to the operation mode is performed.

(22) Further, in addition to the foregoing arrangement, the content display device according to the present invention further includes light-emitting means that varies in color of emitted light according to the operation mode that the control switching instruction receiving means is in.

The foregoing arrangement brings about an effect of making it easier for the user to recognize the current operation mode.

(23) Further, in addition to the foregoing arrangement, the content display device according to the present invention further includes light-emitting means that varies in color of emitted light according to at least either a source or an attribute of the currently displayed content item.

(24) Further, in addition to the foregoing arrangement, the content display device according to the present invention further includes reproduced-music changing means for changing from playback of one piece of music to playback of another according to at least either a source or an attribute of the currently displayed content item.

(25) Further, in addition to the foregoing arrangement, the content display device according to the present invention is characterized in that: the content choosing means and the content display means are controlled by separate application programs; and while the switching instruction to switch the content items is controlled by the application program corresponding to the content choosing means, scrolling of the content items is controlled by the application program corresponding to the content display means.

(26) Further, in addition to the foregoing arrangement, the content display device according to the present invention is characterized in that the content item that is displayed is a menu screen of the content display device.

The foregoing arrangement makes it possible to use the same mechanism for normal content browsing and switching in menu screen of the content display device, thus bringing about an effect of avoiding wastefully preparing a separate mechanism for changing from displaying one menu screen to displaying another.

(27) Further, in addition to the foregoing arrangement, the content display device according to the present invention is characterized in that the content display device is of a portable type.

The foregoing arrangement brings about an effect of enabling the user to easily carry the content display device with him/her.

The content display device may be realized by hardware or by a program executed by a computer. Specifically, a program according to the present invention is a content display control program for causing a computer to operate as at least the aforementioned content choosing means, content display means, content list display means, communication means, and display range control means, and a recording medium according to the present invention has the content display control program recorded therein.

A computer executing the content display control program operates as the content display device. Therefore, as with the content display device, the computer eliminates the need for a user to transfer his/her gaze to see and operate content switching instruction receiving means in giving a content switching instruction, thus bringing about an effect of enabling an improvement in the operationality of the content display device.

Meanwhile, in order to solve the foregoing problems, a content display method according to the present invention is a content display method for displaying content items on a screen, including: a content switching instruction receiving step in which content switching instruction receiving means receives, from a user, a switching instruction to switch the content items; a content choosing step in which content choosing means chooses, based on an order prescribed in a content list, a content item that is displayed on the screen, in accordance with the switching instruction received by the content switching instruction receiving means; and a content display step in which content display means causes the content chosen item by the content choosing means to be displayed on the screen.

In this arrangement, as with the content display device, in the content switching instruction receiving step, the user, who would like to switch the currently displayed content item, puts his/her finger on the wheel and performs an operation of rotating the wheel. The user needs to see the wheel in putting his/her finger on the wheel at the beginning of the operation. However, once the user has put his/her finger on the wheel, the user does not need to transfer his/her gaze from the currently displayed content item to the wheel to see the wheel in switching the content items.

The foregoing arrangement eliminates the need for a user to transfer his/her gaze to see and operate content switching instruction receiving means in giving a content switching instruction, thus bringing about an effect of enabling an improvement in the operationality of the content display device.

The content display device may be arranged such that the content list is a list whose entries are identifiers of the content items and descriptors of locations holding the content items.

The content display device may be arranged such that when a certain period of time has elapsed or when input from the user has been received, the content list display means changes from displaying the content list to displaying a title name of the currently displayed content item.

The content display device may be arranged such that the control switching instruction receiving means is a button provided separately from the content switching instruction receiving means and the display range changing instruction receiving means.

The content display device may be arranged such that the control switching instruction receiving means is a touch sensor provided on the display screen of the content display device.

The content display device may be arranged such that the control switching instruction receiving means performs displays on the screen in accordance with the scrolling mode and the content switching mode, respectively.

The content display device may be arranged to further include light-emitting means that varies in color of emitted light according to whether the scrolling mode or the content switching mode is currently being used.

The content display device may be arranged to further include light-emitting means that varies in color of emitted light according to a source and an attribute of the content item being displayed on the screen.

The content display device may be arranged to further include reproduced-music changing means for changing from playback of one piece of music to playback of another according to a source and an attribute of the content item being displayed on the screen.

The content display device may be arranged such that the content choosing means and the display range control means are separate application programs.

A content display device according to the present may be arranged to have: content list acquisition and display means; drawing means; content control instruction means, content list holding means; and content list analyzing means, the content list analyzing means choosing a content item that is displayed from a content list in accordance with an instruction from the content control instruction means, the content list being held in the content list holding means.

The content display device according to the present invention may be arranged to include communication means, the content acquisition and display means acquiring a content item via the communication means, the content list holding means acquiring a content list from an external server via the communication means.

The content display device according to the present invention may be arranged such that the content acquisition and display means acquires, via the communication means, a content item that is to be displayed prior to designation of a content item by the content control instruction receiving means.

The content display device according to the present invention may be arranged to include display list generating means, and to display at least a part of the content list together with a content item.

The content display device according to the present invention may be arranged such that the content list generating means display a content list in accordance with an instruction from the content control instruction means.

The content display device according to the present invention may be arranged to display a pre-acquired title together with an icon indicating that the title has been acquired in advance.

The content display device according to the present invention may be arranged to display a pre-acquired title together with the amount of a content component that has been acquired in advance.

The content display device according to the present invention may be arranged to change from a list display to a title display of the currently displayed content item after a certain period of time or in accordance with input from the user.

The content display device according to the present invention may be arranged such that the content control instruction means is capable of input in at least two directions.

The content display device according to the present invention may be arranged such that the content control instruction means is an input device having an axis of rotation.

The content display device according to the present invention may be arranged such that the content control instruction means is a spherical input device.

The content display device according to the present invention may be arranged such that the content control instruction means is an electrostatic pad.

The content display device according to the present invention may be arranged to further include automatic display mode switching means, and to perform display control without input from the content control instruction means after having switched to an automatic display mode.

The content display device according to the present invention may be arranged to cancel the automatic display mode upon receiving input from the content control instruction means or other input means in the automatic display mode.

The content display device according to the present invention may be arranged such that the content item that is displayed is a menu screen.

The content display device according to the present invention may be arranged to include: drawing control means for performing drawing control on the content item being displayed; and control switching means for switching control so as to perform the drawing control on the content item in accordance with input from the content control instruction means.

The content display device according to the present invention may be arranged to change the type of scrolling in accordance with the content item being displayed.

The content display device according to the present invention may be arranged such that the drawing control means change the scrolling range of the screen in accordance with the content item being displayed.

The content display device according to the present invention may be arranged such that the operation mode switching means is a button provided separately from the content control instruction means.

The content display device according to the present invention may be arranged such that the operation mode switching means is an electrostatic or pressure-sensitive operating means provided separately from the content control instruction means.

The content display device according to the present invention may be arranged such that: the content control instruction means is an operation of rotating a wheel device having an axis of rotation and able to be pushed in; and the operation mode switching means is an operation of pushing in the wheel device in a direction perpendicular to the axis of rotation.

The content display device according to the present invention may be arranged such that the operation mode switching means is input from a touch sensor provided on the display screen.

The content display device according to the present invention may be arranged to switch the mode to the content switching mode or the scrolling mode in accordance with a touched area on the display screen.

The content display device according to the present invention may be arranged to switch the operation mode to the content switching mode after having scrolled to the end and having been instructed to move farther than the end or after having scrolled to the beginning and having been instructed to move farther than the beginning.

The content display device according to the present invention may be arranged such that on the screen, a display corresponding to the operation mode is performed.

The content display device according to the present invention may be arranged to further include light-emitting means, and to vary in color of emitted light according to the operation mode that the control switching means is currently in.

The content display device according to the present invention may be arranged to further include light-emitting means, and to vary in color of emitted light according to a source or an attribute of the currently displayed content item.

The content display device according to the present invention may be arranged such that the light-emitting means is provided in the content control instruction means or the operation mode switching means.

The content display device according to the present invention may be arranged such that: the content display control means and the content display means are controlled by separate application programs; and the switching instruction to switch the content items and scrolling of the content items is controlled with respect to the programs responsible for the content display control means and the content display means, respectively.

The content display device according to the present invention may be arranged such that the program responsible for the content display means is a browser program.

The content display device according to the present invention may be arranged such that the program responsible for the content display means is a menu display program.

The content display device according to the present invention may be arranged such that the program responsible for the content display means is a mail program.

The content display device according to the present invention may be a television receiver including such a terminal as described above.

The content display device according to the present invention may be of a portable type.

For a fuller understanding of the nature and advantages of the invention, reference should be made to the ensuing detailed description taken in conjunction with the accompanying drawings.

Figure 1:
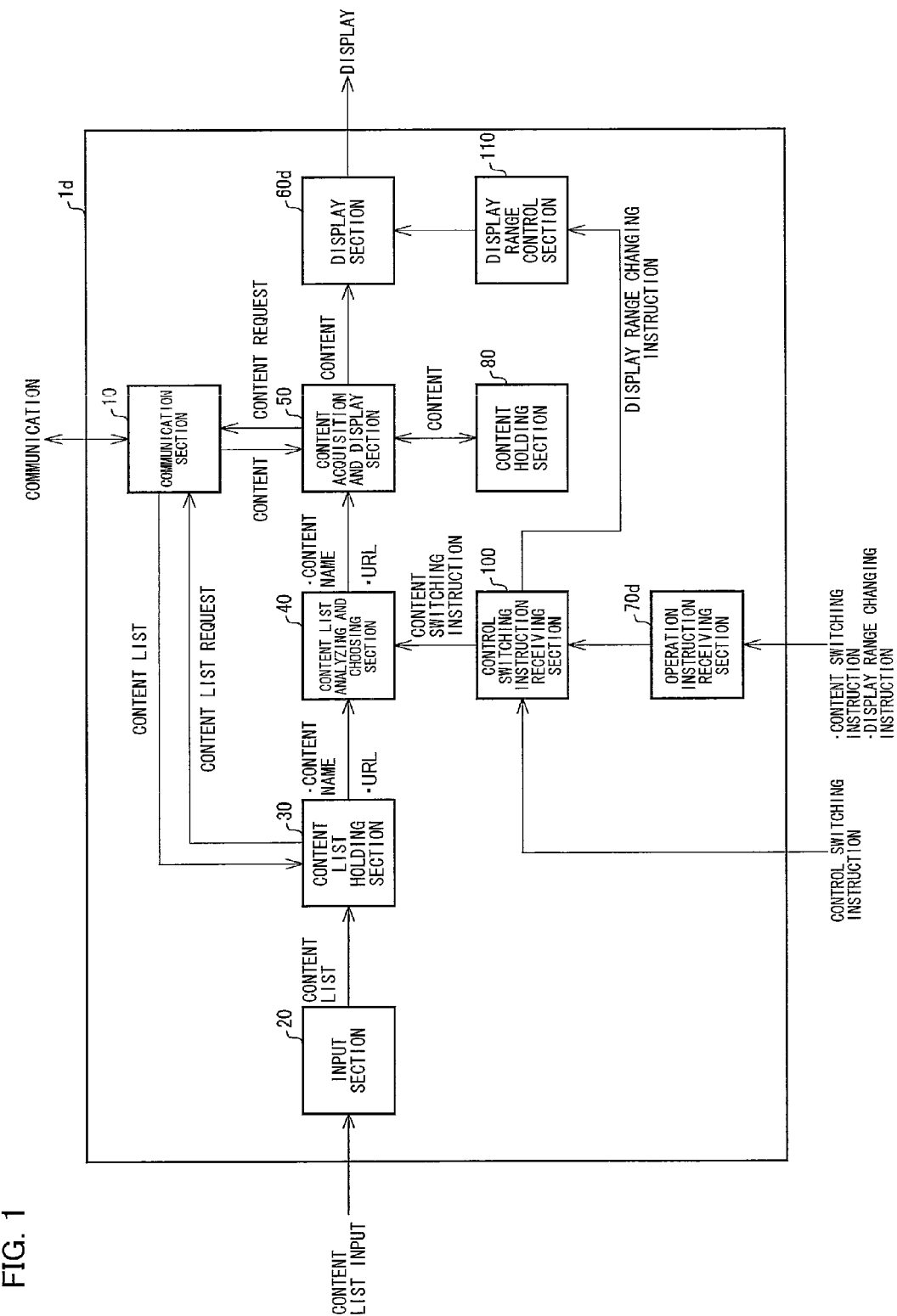
FIG. 1, showing Embodiment 2 of the present invention, is a functional block diagram showing an arrangement of a main part of a content display device.

REFERENCE SIGNS LIST 1, 1a to 1h Content display device
2 Screen
3 Content list window
4 Wheel
5, 5a Switch
5b LED
5c Electrostatic pad
6 Slide-show button (slide-show mode setting means)
7 Control switching button
8, 9 LED
10 Communication section (communication means)
20 Input section
30 Content list holding section (content list acquisition means)
40, 40b, 40c Content list analyzing and choosing section (content choosing means)
50, 50f Content acquisition and display section (content display means)
50c Menu screen generating section (content display means)
60, 60d Display section
70, 70d Operation instruction receiving section (content switching instruction receiving means, display range changing instruction receiving means)
80 Content holding section
80c Menu component holding section
90 Content list display section (content list display means)
100, 100e Control switching instruction receiving section (control switching instruction receiving means)
110 Display range control section (display range control means)
120, 120f Light-emitting section (light-emitting means)
301 Title of content list

DESCRIPTION OF EMBODIMENTS

Embodiments of the present invention are described below with reference to FIGS. 1 through 18.

Operation Example 1

Operation for Browsing Internet Content

FIGS. 2(a) through 2(d) show examples of operation in a portable content display device 1a as examples of operation of a content display device according to the present invention.

FIG. 2(a) shows the appearance of the content display device 1a. The content display device 1a has a screen 2. On the screen 2, a web page on the Internet is being displayed as a content item. On the upper right of the screen 2, a part of a content list is being displayed as a content list window 3. A wheel 4 (content switching instruction receiving means) is rotated to perform a switching operation for switching between web pages corresponding to URLs registered on the content list (content switching mode) and an screen-scrolling operation for scrolling through a web page that cannot be displayed wholly at once on the screen 2 (scrolling mode). Further, a push operation of pushing in the wheel 4 (control switching instruction receiving means) is performed to switch between the scrolling mode and the content switching mode.

FIG. 2(b) shows a transition from one screen to another that is made by rotating the wheel 4 in the content switching mode. First, when a user rotates the wheel 4 (clockwise) with a web page displayed on the screen 2, a web page of the next content item, which has been registered on the content list, is displayed. When the wheel 4 is rotated further continuously, a web page of the further next content item, which has been registered on the content list, is displayed. A switch in content item is accompanied by a switch in content name that is displayed in the content list window 4. It should be noted that a rotation of the wheel 4 in the opposite direction (counter-clockwise) allows a return to a display of a previous web page.

FIG. 2(c) shows a transition from one screen to another that is made by pushing in the wheel 4 to switch from the content switching mode to the scrolling mode. First, a web page is displayed together with the upper right content list window 3. Next, when the user pushes in the wheel 4, a switch from the content switching mode to the scrolling mode is made. On the screen 2, the content list window 4 is replaced with a character string "SCROLLING MODE", displayed on the upper right of the screen 2, which indicates that the content display device 1a is currently in the scrolling mode.

FIG. 2(d) shows a transition from one screen to another that is made by rotating the wheel in the scrolling mode. First, when the user rotates the wheel 4 (clockwise) with a web page displayed on the screen 2, the web page is scrolled up, whereby an intermediate portion of the web page is displayed on the screen 2. When the wheel 4 is rotated further continuously, the web page is scrolled further up, whereby a lower portion of the web page is displayed on the screen 2. It should be noted that a rotation of the wheel 4 in the opposite direction (counterclockwise) allows scrolling down the web page.

Embodiment 1

In the present embodiment, a content display device that changes from displaying one content item registered on a content list to displaying another.

<Arrangement of a Content Display Device>

Figure 3:
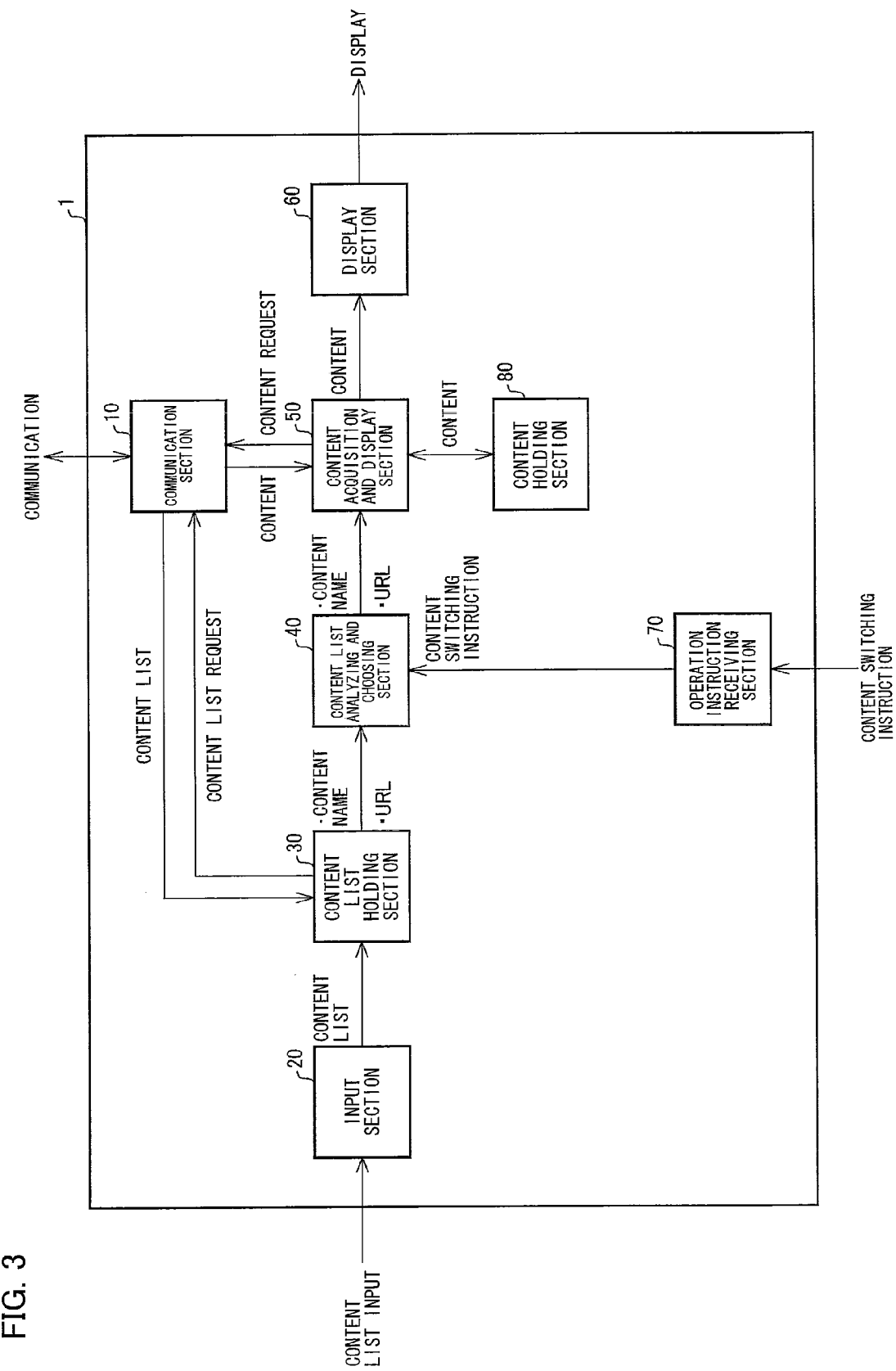
FIG. 3, showing Embodiment 1 of the present invention, is a functional block diagram showing an arrangement of a main part of a content display device.

FIG. 3 shows a functional block diagram of a content display device 1 according to the present embodiment.

The content display device 1 includes a communication section 10 (communication means), an input section 20, a content list holding section 30, a content list analyzing and choosing section 40 (content choosing means), a content acquisition and display section 50 (content display means), a display section 60, an operation instruction receiving section (content switching instruction receiving means), and a content holding section 80.

The communication section 10, which communicates with the outside, transmits a request for a content item and a content list to an external server and receives the requested content item or content list from the external server. The content list thus received is sent to the content list holding section 30, and the content item thus received is sent to the content acquisition and display section 50.

The input section 20 receives a content name and a URL from a user and sends them to the content list holding section 30.

The content list holding section 30 holds a content list on which the content names and URLs of content items have been registered as entries. The content list may be held in the content list holding section 30 in advance, registered by the user via the input section 20, or acquired from the external server via the communication section 10.

It should be noted that the content list holding section 30 may automatically acquire a content list from outside via the communication section 10 and store it in itself. Alternatively, in cases where the content display device 1 is connected to an external storage device (e.g., an external memory), in which a content list has been stored, the content list holding section 30 may acquire the content list by accessing the external storage device and store it in itself.

The content list analyzing and choosing section 40 acquires a content list from the content list holding section 30 and interprets entries in the content list and an order in which the entries are written. Moreover, in accordance with a content switching instruction sent from the operation instruction receiving section 70, the content list analyzing and choosing section 40 sends, to the content acquisition and display section 50, content names contained in the entries in the content list and URLs corresponding to the content names.

The content acquisition and display section 50 judges whether or not the content holding section 80 is already holding a content item whose content name has been sent from the content list analyzing and choosing section 40. In cases where the content holding section 80 is already holding the content item, the content acquisition and display section 50 acquires the content item from the content holding section 80 and presents it to the user via the display section 60. In cases where the content holding section 80 is not holding the content item, the content acquisition and display section 50 acquires the content item from outside via the communication section 10 in accordance with the URL of the content item. The content item thus acquired from outside is sent to and stored in the content holding section 80 and also presented to the user via the display section 60.

The display section 60, constituted by a liquid crystal display device and the like, displays, on the screen 2, a content item that the content acquisition and display section 50 has requested the display section 60 to display.

The operation instruction receiving section 70, constituted, for example, by the wheel 4 described above in Operation Example 1, receives a content switching instruction from the user. The content switching instruction thus received is sent to the content list analyzing and choosing section 40.

The content holding section 80, holding a content item stored in advance, sends the content item in response to a request from the content acquisition and display section 50. Further, the content holding section 80 responds to an inquiry from the content acquisition and display section 50 as to whether or not the content holding section 80 is holding a particular content item. Moreover, when the content holding section 80 responds that it is not holding such a particular content item and the content item is acquired from outside via the communication section 10, the content holding section 80 holds the content item.

The following describes the flow of a process.

A content switching instruction from the user is conveyed to the content list analyzing and choosing section 40 via the operation instruction receiving section 70. The content list analyzing and choosing section 40 analyzes a content list held in the content list holding section 30, chooses a content item that is to be displayed next, and informs the content acquisition and display section 50 of the content name and URL of the content item thus chosen. The content acquisition and display section 50 acquires the designated content item from the content holding section 80, or from outside via the communication section 10, and presents it to the user via the display section 60.

It should be noted that it is possible for the content acquisition and display section 50 to acquire a content list from the content list analyzing and choosing section 40 in advance prior to designation from the content list analyzing and choosing section 40 and look ahead to a content item in accordance with URLs contained in some entries in the content list. In this case, the content acquisition and display section 50 acquires the content list from the content list analyzing and choosing section 40 in advance and acquires, via the communication section 10 in advance, a content item that is on the content list but is not held in the content holding section 80. In response to incoming designation of a chosen content item from the content list analyzing and choosing section 40, the content acquisition and display section 50 presents the pre-acquired content item to the user via the display section 60. This makes it possible to reduce the amount of time from the user's content switching instruction operation to the presentation of the content item.

<Display of a Part of a Content List (Content List Window)>

In displaying a content item on a screen, it is possible to improve user-friendliness by displaying at least a part of a content list as a content list window 3 in addition to displaying the content item per se and showing on the screen which entry in the content list corresponds to the currently displayed content item.

Figure 4:
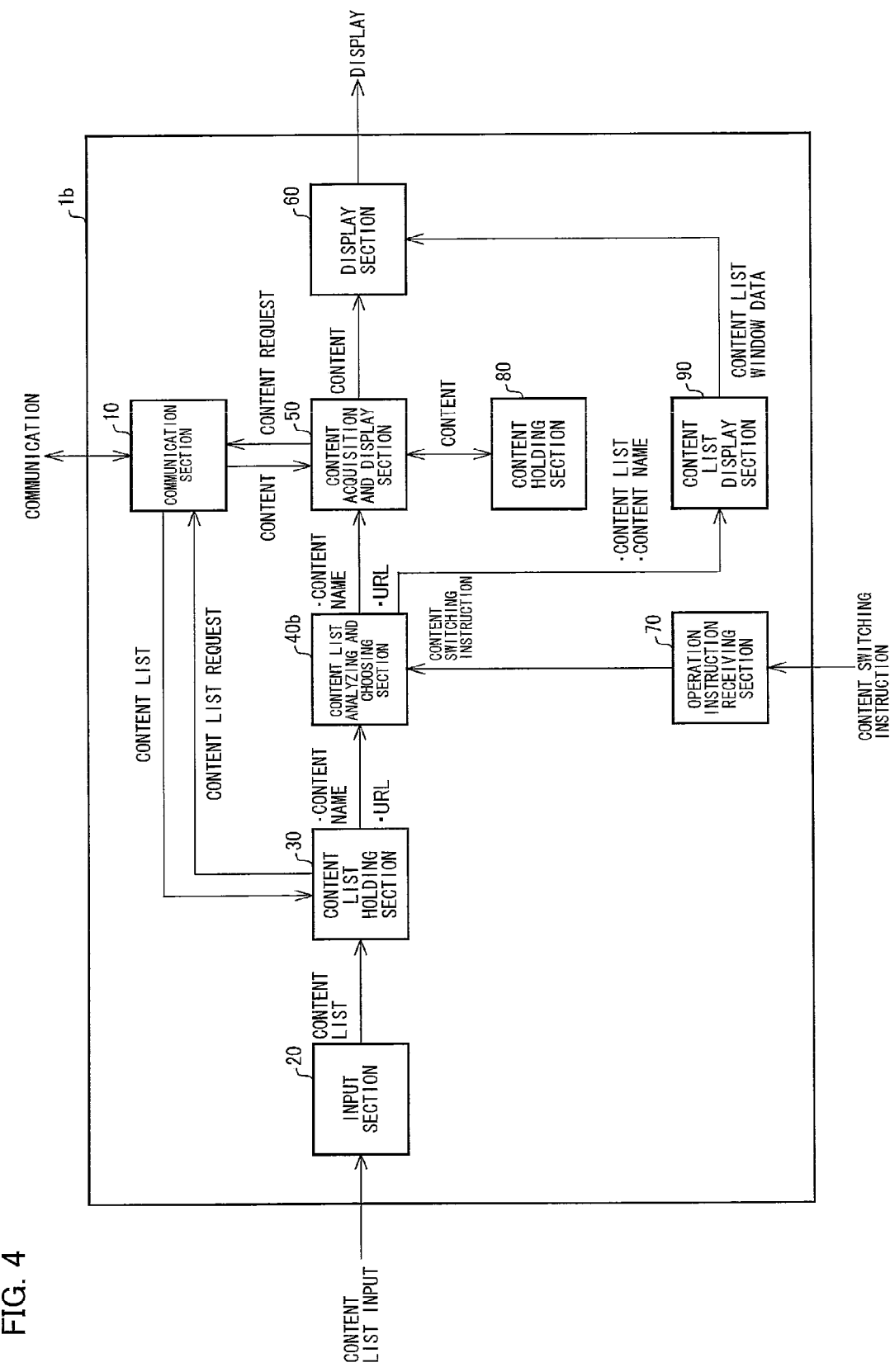
FIG. 4, showing Embodiment 1 of the present invention, is a functional block diagram showing an arrangement of a main part of a content display device having a function of displaying a content list window.

FIG. 4 shows a functional block diagram of a content display device 1b having a function of displaying a content list window 3. The content display device 1b is different from the content display device 1 of FIG. 3 in that the content display device 1b further includes a content list display section 90.

The content display device 1b is identical to the content display device 1 in flow from a user's content switching instruction to a display of a content item to which a switch has been made. The provision of the content list display section 90 allows a content list analyzing and choosing section 40b to send a chosen content name and its corresponding URL to the content acquisition and display section 50 and also send a content list and the chosen content name to the content list display section 90. The content list display section 90 generates a content display window 3 that is presented to the user, and displays the content display window 3 on the screen 2 via the display section 60.

Figure 5:
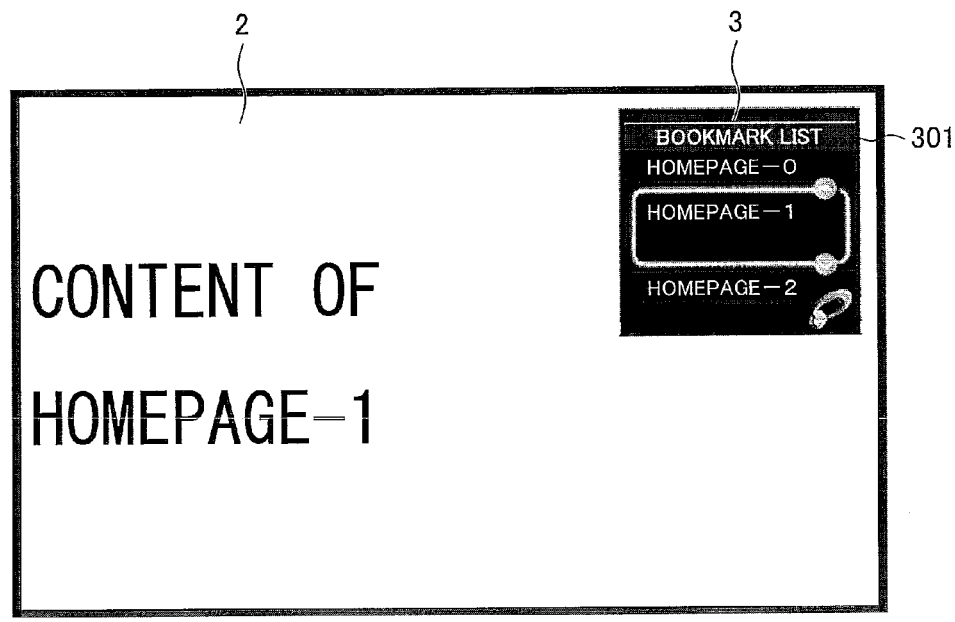
FIG. 5 shows an example of a content list window.

FIG. 5 shows an example of the content list window 3. The screen 2 is displaying a web page of "HOMEPAGE-1", which is a content item chosen by the content list analyzing and choosing section 40b.

Moreover, the screen 2 has a content list window 3 displayed on the upper right thereof. Displayed at the top of the content list window 3 is a title 301 of the content list, i.e., "BOOKMARK LIST". Displayed below the title 301 are three content names "HOMEPAGE-0", "HOMEPAGE-1", and "HOMEPAGE-2".

These three content names are content names, contained in the content list "BOOKMARK LIST", one of which is the name of the currently displayed content item, another one of which is a content name written immediately above the name of the currently displayed content item, the other one of which is a content name written immediately below the name of the currently displayed content item. The order in which these three content names are arranged corresponds to the order in which entries containing these content names are written. That is, in the content list "BOOKMARK LIST", an entry containing the content name "HOMEPAGE-0" is written above an entry containing the content name "HOMEPAGE-1" and an entry containing the content name "HOMEPAGE-2" is written below the entry containing the content name "HOMEPAGE-1".

It should be noted that although the order of entries has been defined above as the order in which the entries are written on the content list, the order of entries may be defined differently. Further, reordering means can be provided to reorder the entries in the alphabetical order of the content names of the entries or in the order of updates of the content items.

The content name "HOMEPAGE-1" of the web homepage-1, which is the currently displayed content item, is encircled by a line indicating that the content name is currently being chosen, so as to be distinguished from the other content names.

The display of the current content name, the content name above the current content name, and the content name below the current content name in the content list window allows the user to foresee which of the content items will be displayed when he/she gives the next content switching instruction.

In the example shown in FIG. 5, the content name of the currently chosen content item, the immediately preceding content name, and the immediately following content name are being displayed. However, it is possible to display two or three sequentially preceding content names and two or three sequentially following content names. Further, it is possible to wholly display the content list instead of partially displaying the content list.

<Display of the Lookahead Status of Content>

As mentioned above, the content acquisition and display section 50 may look ahead to a content item in the content list prior to the choice of a content item in the content list analyzing and choosing section. The status of the lookahead may be presented to the user together with each content name in the content list window 3.

The status of the lookahead indicates, for example, whether or not a content item to look ahead to has already been read or, in cases where the reading has not been completed, how much the reading has been completed.

Figure 6:
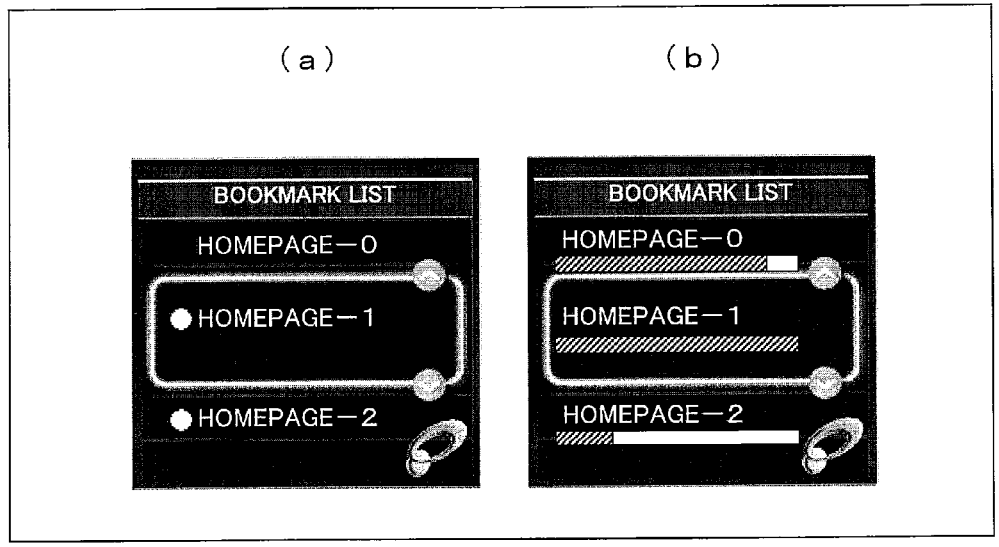
FIG. 6 shows examples where the lookahead status of a content item is displayed in a content list window, i.e., (a) an example where a content item finished with lookahead is displayed with a mark and (b) an example where degrees of completion of lookahead are displayed in the form of a bar graph.

FIG. 6 shows examples of how the lookahead status is displayed. In the example shown in (a) of FIG. 6, the content names "HOMEPAGE-1" and "HOMEPAGE-2" each have a circle displayed on the right to indicate the content item has already been finished with lookahead. In the example shown in (b) of FIG. 6, each status bar represents how much a content item to look ahead to has been read.

The status of the lookahead may be displayed by changing the font type, font size, or font color of characters representing the content names or the background color, as well as by displaying such circles or status bars.

<Timing for the Display of the Content List Window>

It is preferable that the timing for the display of the content list window 3 be a point of time where the user has attempted to switch the content items, i.e., a point of time where the user has given a content switching instruction to the operation instruction receiving section 70. Specifically, it is preferable that when the operation instruction receiving section 70 has first sent a content switching instruction to the content list analyzing and choosing section 40b with no content list window 3 displayed on the screen 2, the content list display section 90 display the content list window on the screen 2. In this arrangement, the content list window 3 is not displayed on the screen 2 except at the time of content switching. This makes it possible to prevent the content list window 3 from being displayed to hide a part of the content item being displayed on the screen 2.

<Change in Content List Window Display by Passage of Time>

The display contents of the content list window 3 may be changed when a predetermined period of time has elapsed since the content list window 3 was displayed. In order to judge whether a predetermined period of time has elapsed, the content list display section 90 may include a timer (not shown). Alternatively, the content display means 1b may include a timer to notify the content list display section 90 that a predetermined period of time has elapsed. The content list display section 90 changes the display in the content list window 3 in response to the passage of a predetermined period of time as a trigger.

Figure 7:
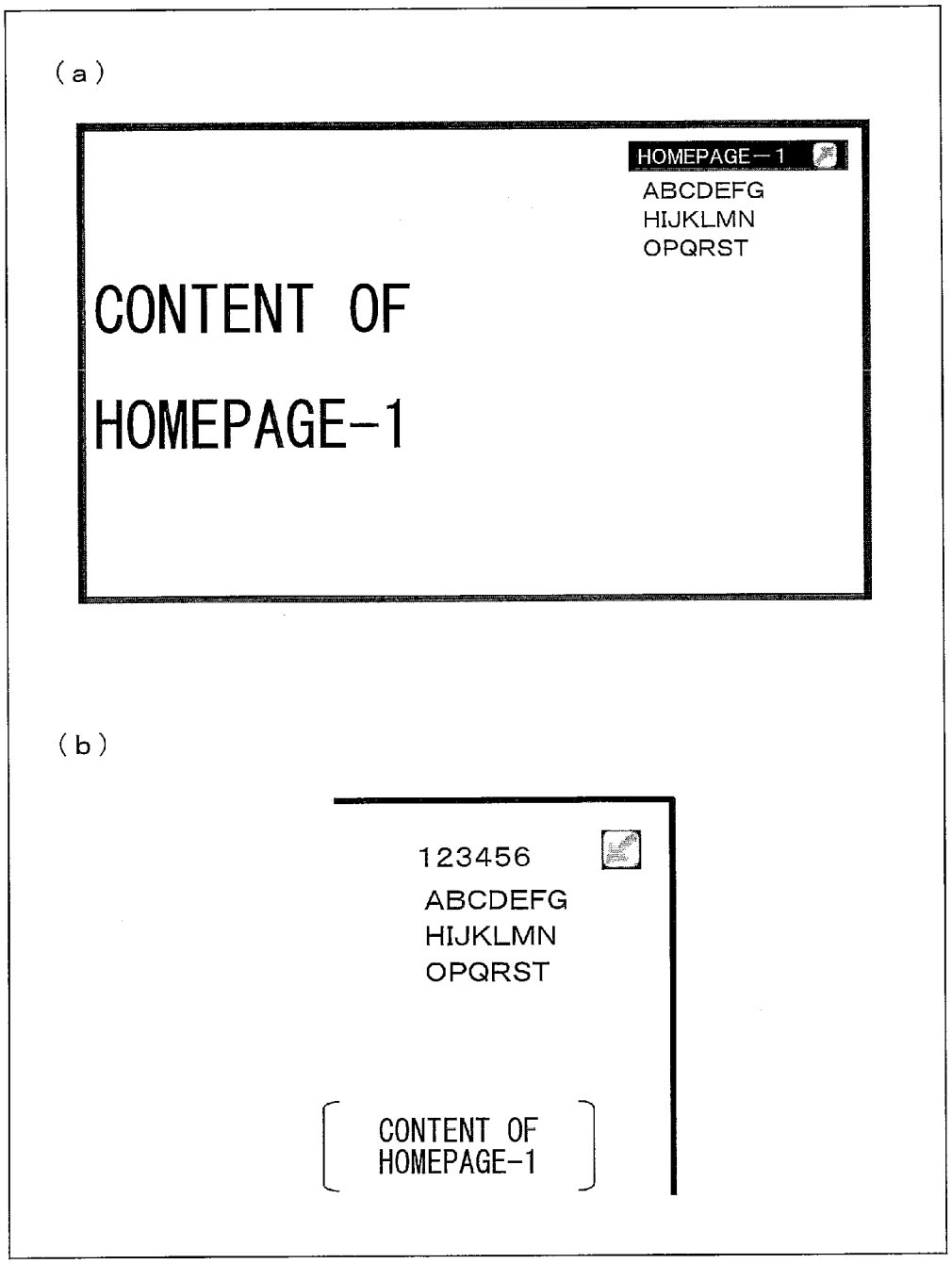
FIG. 7 shows examples of a change in display in a content list window, i.e., (a) an example where only the name of a content item being displayed is displayed and (b) an example where only an icon is displayed.

FIG. 7 shows examples of a change in display. (a) of FIG. 7 shows an example of a display to which the content list window 3 of FIG. 6 is changed after the passage of a predetermined period of time. In this example, the display contents of the content list window 3 is changed to the display of the content name of the currently displayed content item, whereby hidden characters such as "ABCDEFG" appear so that the user can see them.

When a predetermined period of time has further elapsed in the state where only the content name is displayed, a transition may be made to a state where only an icon is displayed as shown in (b) of FIG. 7. In this example, the content list window 3 is changed to displaying only the icon, whereby hidden characters "123456" appear so that the user can see them.

When a predetermined period of time has further elapsed in the state when only the icon is displayed as shown in (b) of FIG. 7, the icon is not displayed, either. That is, the content list window 3 is completely eliminated from the screen 2.

The display position of the content list window 3, the display position of the content name in the state where only the content name is displayed, the display position of the icon in the state where only the icon is displayed may be changed on the user's instructions.

The display contents of the content list window 3 may be changed in response to input from the user as a trigger, as well as the passage of time as a trigger.

<Operation Instruction Receiving Section>

Figure 8:
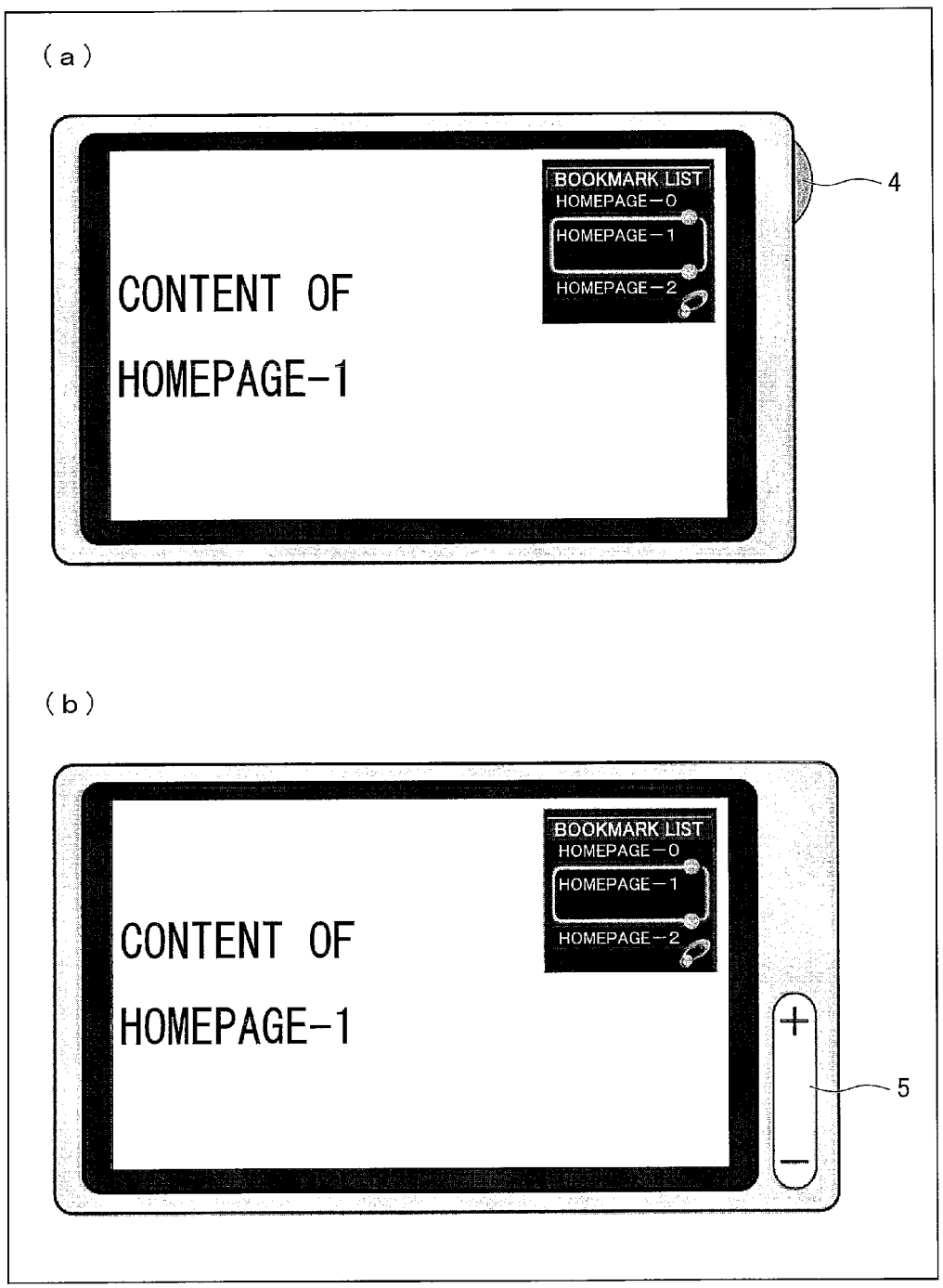
FIG. 8 shows examples of an operation instruction receiving section of a content display device according to the present invention, i.e., (a) an example where the operation instruction receiving section takes the form of a wheel and (b) an example where the operation instruction receiving section takes the form of a switch capable of bidirectional input.

FIG. 8 shows examples of the operation instruction receiving section 70.

The example shown in (a) of FIG. 8 is the wheel 4, which is a rotating input device provided in the main body of the content display device 1b, as mentioned above. The wheel 4 is rotated clockwise or counterclockwise to switch the content items in the content list.

The example shown in (b) of FIG. 8 is a switch 5, provided in the main body of the content display device 1b, which is capable of input in vertical directions. The switch 5 has "+" and "−" portions that are pressed to switch the content items. The switch 5 may be an electrostatic or pressure-sensitive touch pad, or may be a mechanical switch. Further, in cases where bidirectional input is not required for content switching, it is only necessary to provide a unidirectional, i.e., an on/off button alone.

Further, the operation instruction receiving section 70 may be realized by an cross key, a character input keyboard, a mouse switch, a track ball, or the like provided in the main body of the content display device 1b.

<Slide-Show Mode>

The content display device 1 and the content display device 1b may each be arranged to include a slide-show mode in which content items registered on a content list are displayed in sequence automatically without a content switching instruction being sent from a user to switch from one content item to another.

Figure 9:
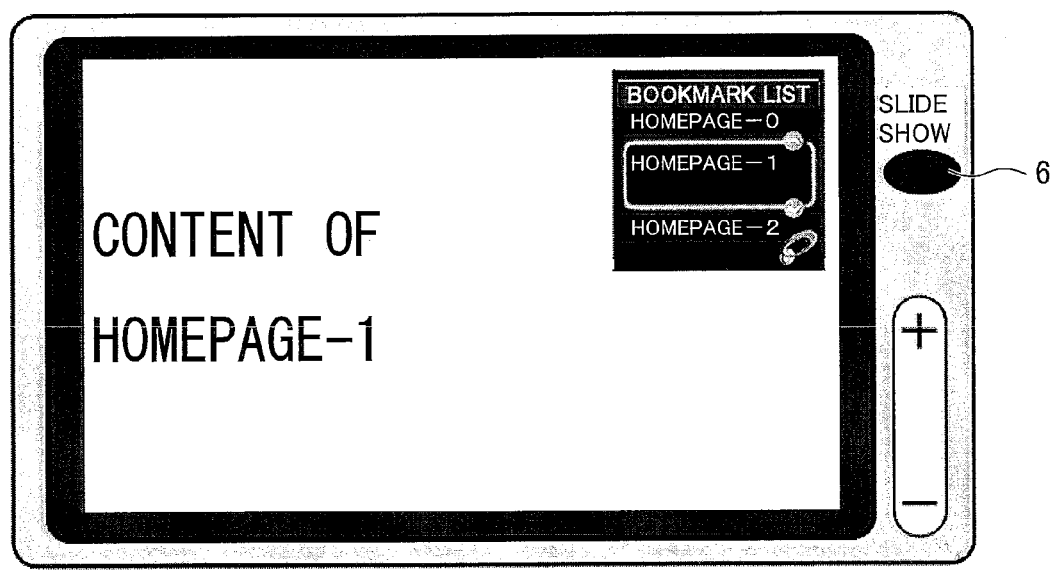
FIG. 9 shows an example where a content display device according to the present invention includes a slide-show button.

In this arrangement, the content display device 1 and the content display device 1b include a slide-show button 6 in addition to the wheel 4 or the switch 5 as the operation instruction section 70, for example, as shown in FIG. 9.

A pressing of the slide-show button 6 by the user causes a slide-show mode execution instruction to be conveyed to the content list analyzing and choosing section 40b via the operation instruction receiving section 70. In response to notifications sent from a timer at regular time intervals, the content list analyzing and choosing section 40b chooses content items in order of registration on a content list held in the content list holding section 30. Steps of a process after the choice of a content item are the same as those mentioned above.

It should be noted that when in the slide-show mode the operation instruction receiving section 70 of the input section 20 receives input from the user, the slide-show mode may be canceled. Further, the content display devices 1 and 1b may each be provided with a light-emitting section (not shown) for showing the current display mode to the user, e.g., for showing the user whether the slide-show mode is being used.

<Applications to Mail Browsing, Menu Screen Display, and Operation of Other Devices>

The foregoing description assumes that the screen 2 shows web pages as content items. In addition, the switching technique according to the present invention can be used as a method for, in browsing email with use of a mail application, changing from displaying the contents of one email to another. The switching technique according to the present invention can also be used as a method for, in cases where the content display device has a plurality of menu screens, switching from one of the menu screen to another.

Figure 10:
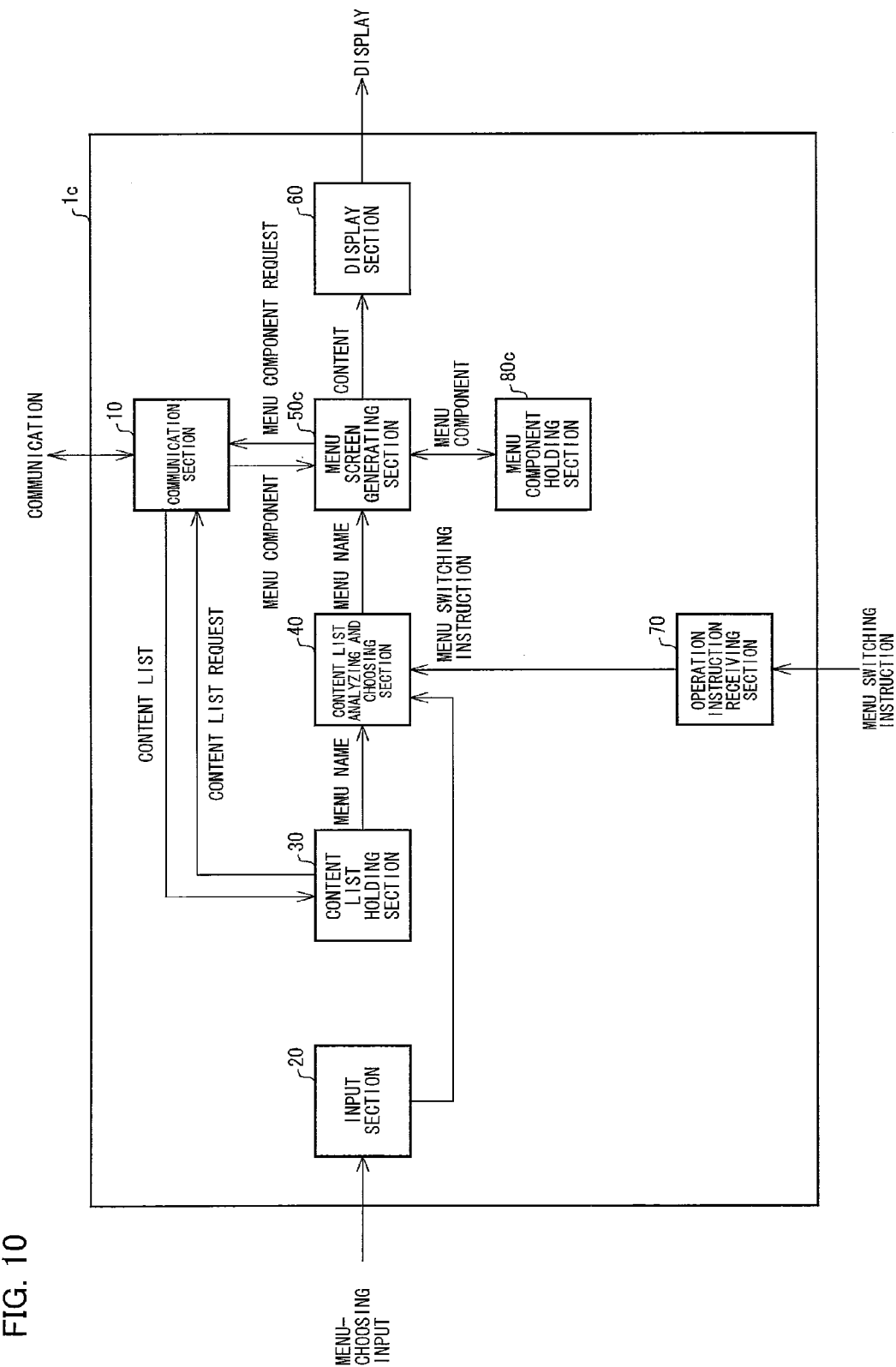
FIG. 10 is a functional block diagram showing an arrangement of a main part of a content display device obtained by applying a switching technique according to the present invention to switch from one menu screen to another.

FIG. 10 shows a function block diagram of a content display device 1c obtained by applying the switching technique according to the present invention to switch from one menu screen to another.

The content display device is includes: a menu screen generating section 50c, which replaces the content acquisition and display section 50; and a menu component holding section 80c, which replaces the content holding section 80.

The flow of a process from reception of a user's switching instruction to a display is the same as that of the previously-mentioned process. A content list analyzing and choosing section 40c chooses a menu that is to be displayed, and then instructs the menu screen generating section 50c to generate a menu screen. The menu screen generating section 50c generates the menu screen with use of menu component data held in the menu component holding section 80c and displays it via the display section 60. The menu component data may be held in the menu component holding section 80c in advance, or may be acquired from the external server via the communication section 10.

Also in the case of a switch from one menu screen to another, the information on a menu chosen can be displayed on the screen 2 with the use of the content list display section 90.

Furthermore, replacement of the content acquisition and display section 50 by a control section for controlling other devices makes it possible to control other devices through the same operation as the content switching. The content list analyzing and choosing section 40 chooses the contents of operation, and then instructs the control section on the contents of operation. In accordance with the contents of operation, the control section gives an operation instruction to an external device via the communication section. Use of this example makes it possible, for example, to control a device on hand to change channels and internet homepages on a remote living television. It is also possible to perform a display at a terminal on hand at the same time. In this example, the outline of a program is displayed at the terminal on hand, and the main part of the program is played on the remote living television.

Embodiment 2

The present embodiment describes a content display device whose operationality has been improved by comprehensively optimizing (i) an operation for controlling the display range of a currently displayed content item, in addition to (ii) the operation, described in Embodiment 1, for changing from displaying one content item registered on a content list to displaying another, from the viewpoint of regarding the operations as a series of a user's operations.

In the following, the term "content switching mode" means an operation mode in which to change from displaying one content item registered on a content list to displaying another, and the term "scrolling mode" means an operation mode in which to control the display range of a currently displayed content item.

<Arrangement of a Content Display Device>

FIG. 1 shows a functional block diagram of a content display device 1d according to the present embodiment. As shown in the functional block diagram of FIG. 1, the content display device 1d is different from Embodiment 1 or, in particular, from the content display device 1 of FIG. 3 as described below.

The content display device 1d includes a control switching instruction receiving section 100 (control switching instruction receiving means) and a display range control section 110 (display range control means) in addition to the functional blocks of the content display device 1.

An operation instruction receiving section 70d (content switching instruction receiving means, display range changing instruction receiving means) receives, from the user, a display range changing instruction for changing the display range of a currently displayed content item, in addition to a content switching instruction. The content switching instruction and the display range changing instruction thus received are sent to the control switching instruction receiving section 100.

The control switching instruction receiving section 100 receives, from the user, a control switching instruction for switching from the content switching mode to the scrolling mode, and then switches from the content switching mode to the scrolling mode. Further, based on the current mode, the control switching instruction receiving section 100 distributes, into the content list analyzing and choosing section 40 and the display range control section 110, the content switching instruction and the display range changing instruction sent from the operation instruction receiving section 70d, respectively.

That is, when the current mode is the content switching mode, the control switching instruction receiving section 100 recognizes the instruction from the operation instruction receiving section 70d as the content switching instruction, and sends the instruction to the content list analyzing and choosing section 40. Further, when the current mode is the scrolling mode, the control switching instruction receiving section 100 recognizes the instruction from the operation instruction receiving section 70d as the display range changing instruction, and sends the instruction to the display range control section 110.

The display range control section 110 changes, in accordance with the display range changing instruction received from the control switching instruction receiving section 100, the display range of a content item being displayed on the screen 2.

<Display Range Control>

Specific examples of display range changing control are line-by-line or page-by-page scrolling and scaling up or down of a currently displayed item in a vertical direction, a horizontal direction, or an oblique direction. In the case of a content item displayed on a part of the screen 2, the change of display range encompasses a change of the position of the content item.

The unit of scrolling may be line-by-line scrolling, several-line scrolling, half-screen scrolling, full-screen scrolling, or the like. Further, the unit of scrolling may be user configurable. Furthermore, the unit of scrolling may be changed in accordance with the type of content item. For example, line-by-line scrolling may be used when the type of content item is a diary site mostly containing characters. Half-page scrolling may be used when the type of content item is a photograph site mostly containing still images. Page-by-page scrolling may be used when the type of content item is a thumbnail of an animated content item.

Further, the control switching instruction receiving section 100 may determine the type of content item and thereby change the type of scrolling, the place of scrolling, and the like. For example, such control is possible that full-screen scrolling is used when the content item is a web page, and that when the content item is a scheduling table, scrolling is performed only on an area corresponding to the contents of the schedule. It should be noted that it is possible not only to change the way of scrolling but also to switch among months on a calendar.

<Steps of a Process>

Figure 11:
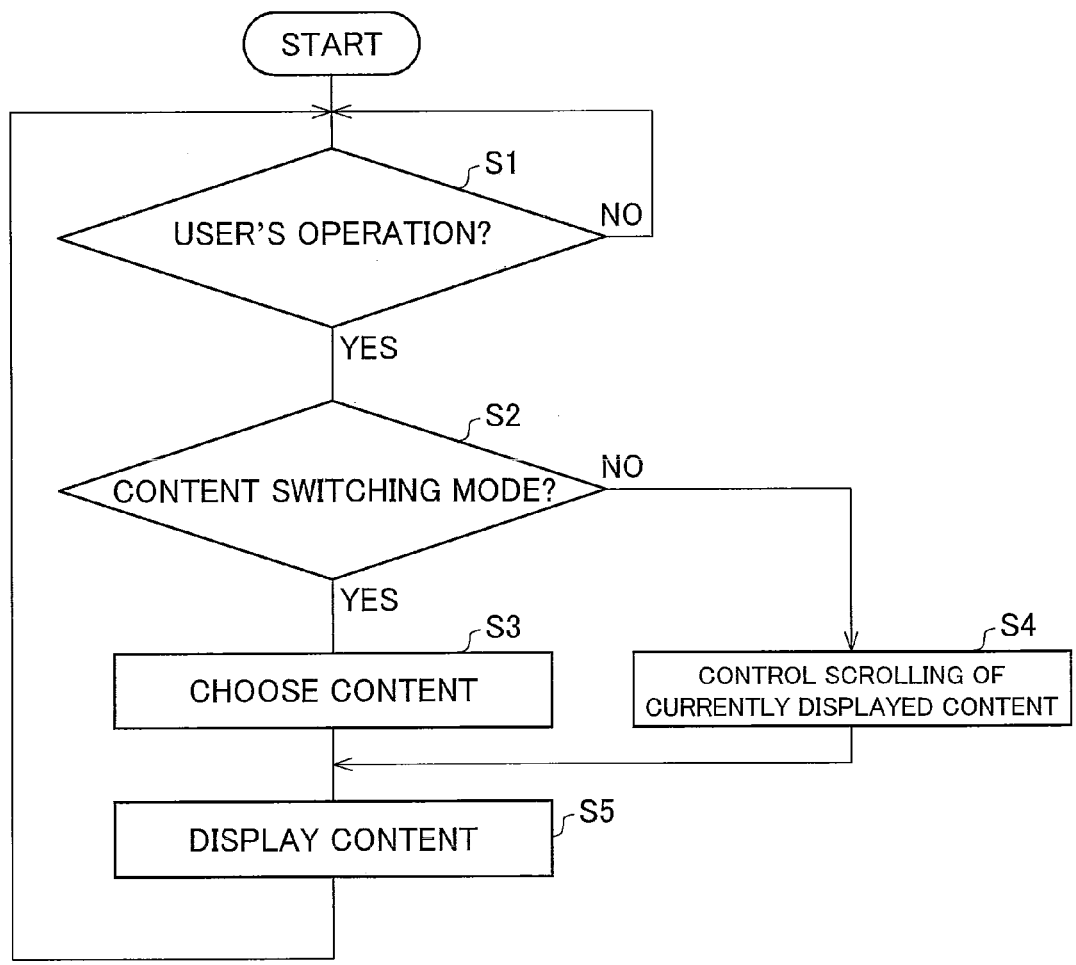
FIG. 11 is a flow chart showing an outline of steps of a process that is performed by a content display device according to the present invention.

FIG. 11 is a flow chart showing an outline of steps of a process from reception of a user's instruction to a display of a content item by the content display device 1d according to the present embodiment.

First, the operation instruction receiving section 70d judges whether or not there is input from the user (Step 1; hereinafter referred to as "S1").

When there is input from the user, the content display device 1d proceeds to S2.

When there is no input from the user, the content display device 1d returns to S1.

When there is input from the user, the operation instruction receiving section 70d sends the input instruction to the control switching instruction receiving section 100. Then, the control switching instruction receiving section 100 judges whether the current mode is the content switching mode or the scrolling mode (S2).

When the current mode is the content switching mode, the content display device 1d proceeds to S3.

When the current mode is the scrolling mode, the content display device 1d proceeds to S4.

When the current mode is the content switching mode, the control switching instruction receiving section 100 recognizes the input from the operation instruction receiving section 70d as a content switching instruction, and sends the instruction to the content list analyzing and choosing sections 40. The content list analyzing and choosing sections 40 chooses, in accordance with the received content switching instruction and a content list, a content item that is to be displayed next, and sends a content name and URL of the chosen content item to the content acquisition and display section 50. The content acquisition and display section 50 acquires the content item via the communication section 10 as needed in accordance with the URL, and sends the content item to a display section 60d (S3). Then, the content display device 1d proceeds to S5.

When the current mode is the scrolling mode, the control switching instruction receiving section 100 recognizes the input from the operation instruction receiving section 70d as a display range changing instruction for changing the display range of a currently displayed content item, and sends the instruction to the display range control section 110. The display range control section 110 changes the display range of the currently displayed content item in accordance with the display range changing instruction, and sends, to the display section 60d, the content item whose display range has been changed (S4).

Next, the display section 60d displays, on the screen 2, (i) the content item, received from the content acquisition and display section 50, which is to be displayed, or (ii) the content item, sent from the display range control section 110, whose display range has been changed (S5). Then, the content display device 1d returns to S1 and repeats the process.

<Example of the Control Switching Instruction Receiving Section>

Figure 12:
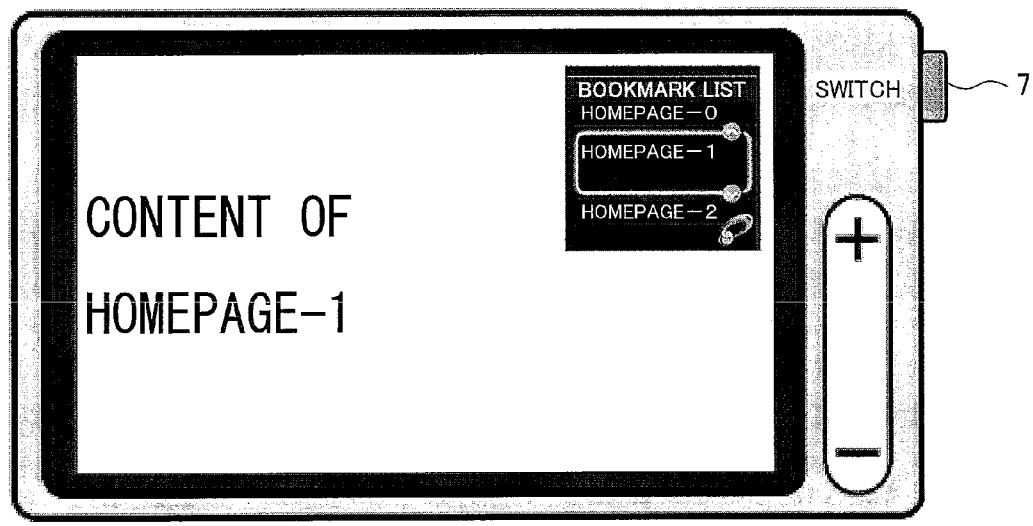
FIG. 12 shows an example of a control switching instruction receiving section according to Embodiment 2.

FIG. 12 shows an example of the control switching instruction receiving section 100. In this example, the content display device 1d has a control switching button 7 provided on a side face thereof. Every pressing of the control switching button 7 causes a switch between the content switching mode and the scrolling mode.

Figure 2:
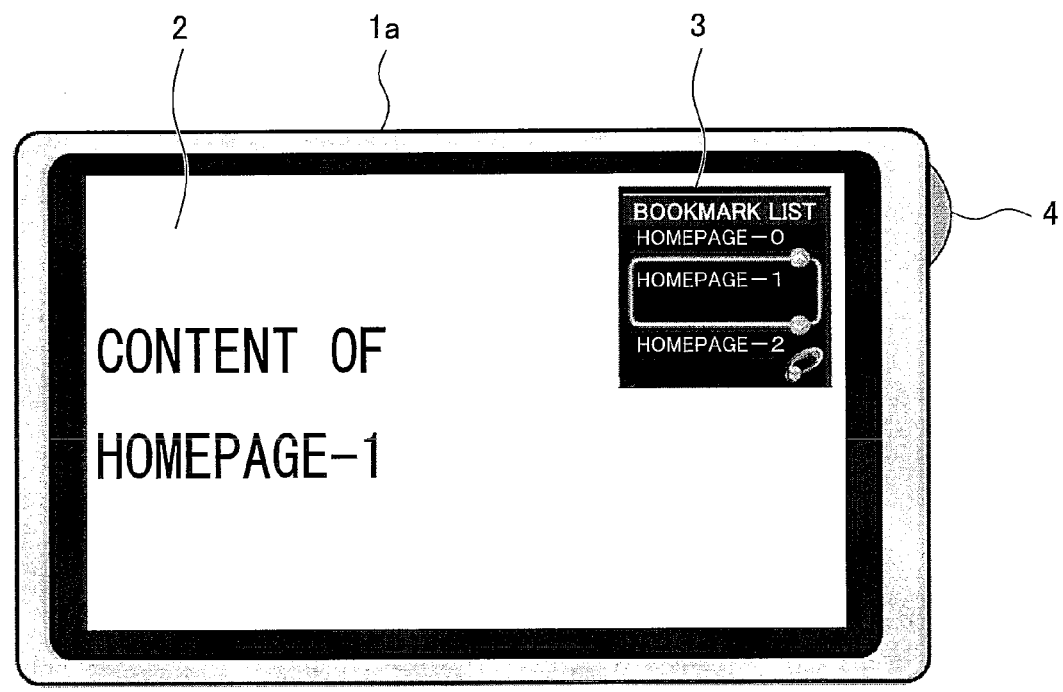
FIG. 2(a) shows an example of operation of a portable content display device according to Embodiment 2 of the present invention and the appearance of the content display device.
FIG. 2(b) shows an example of operation of the portable contend display device according to Embodiment 2 of the present invention and shows a transition from one screen to another that is made by rotating a wheel in a content switching mode.
FIG. 2(c) shows an example of operation of the portable contend display device according to Embodiment 2 of the present invention and a transition from one screen to another that is made by pushing in the wheel to switch from the content switching mode to a scrolling mode.
FIG. 2(d) shows an example of operation of the portable contend display device according to Embodiment 2 of the present invention and a transition from one screen to another that is made by rotating the wheel in the scrolling mode.
Figure 2:
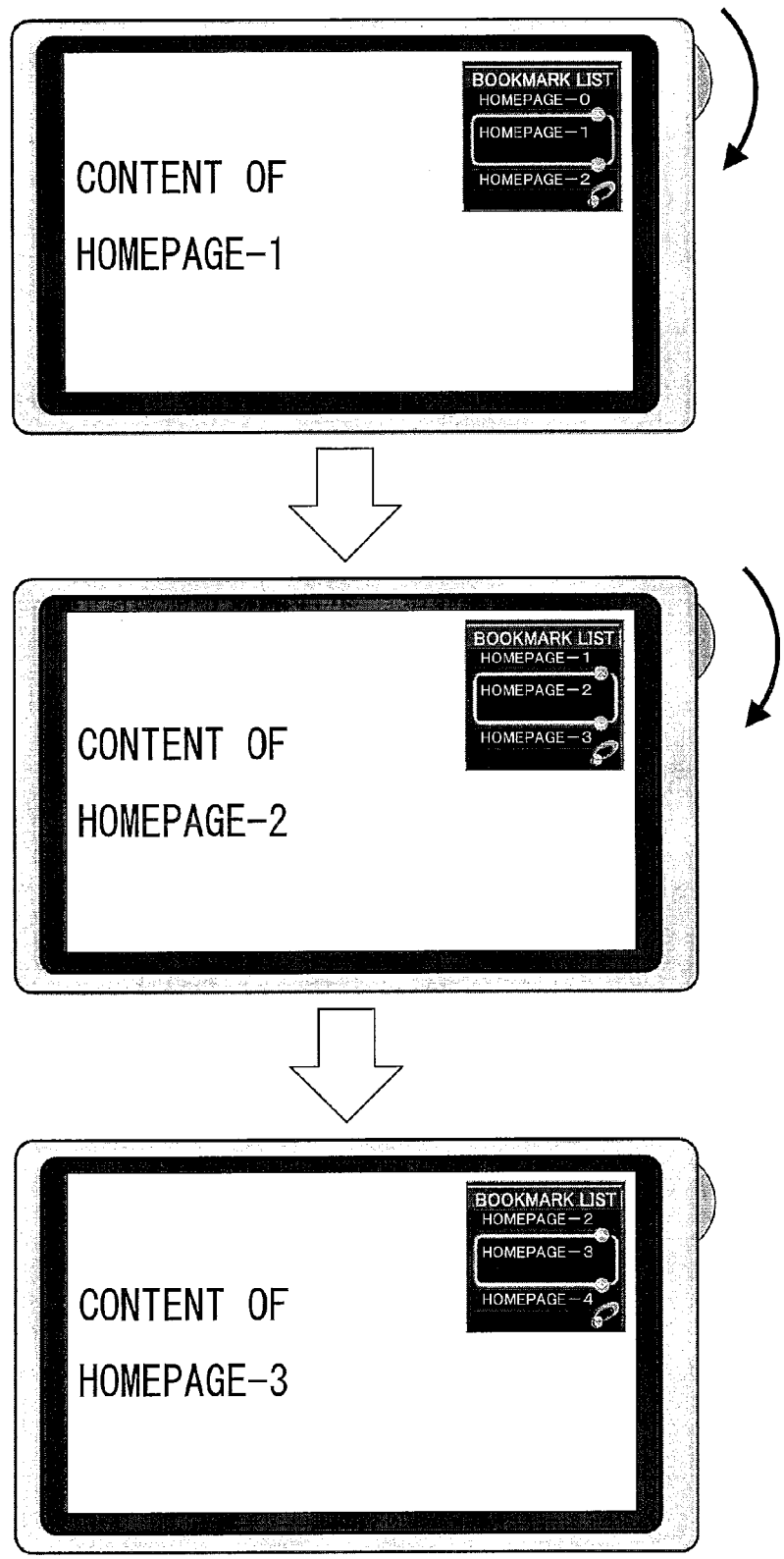
Figure 2:
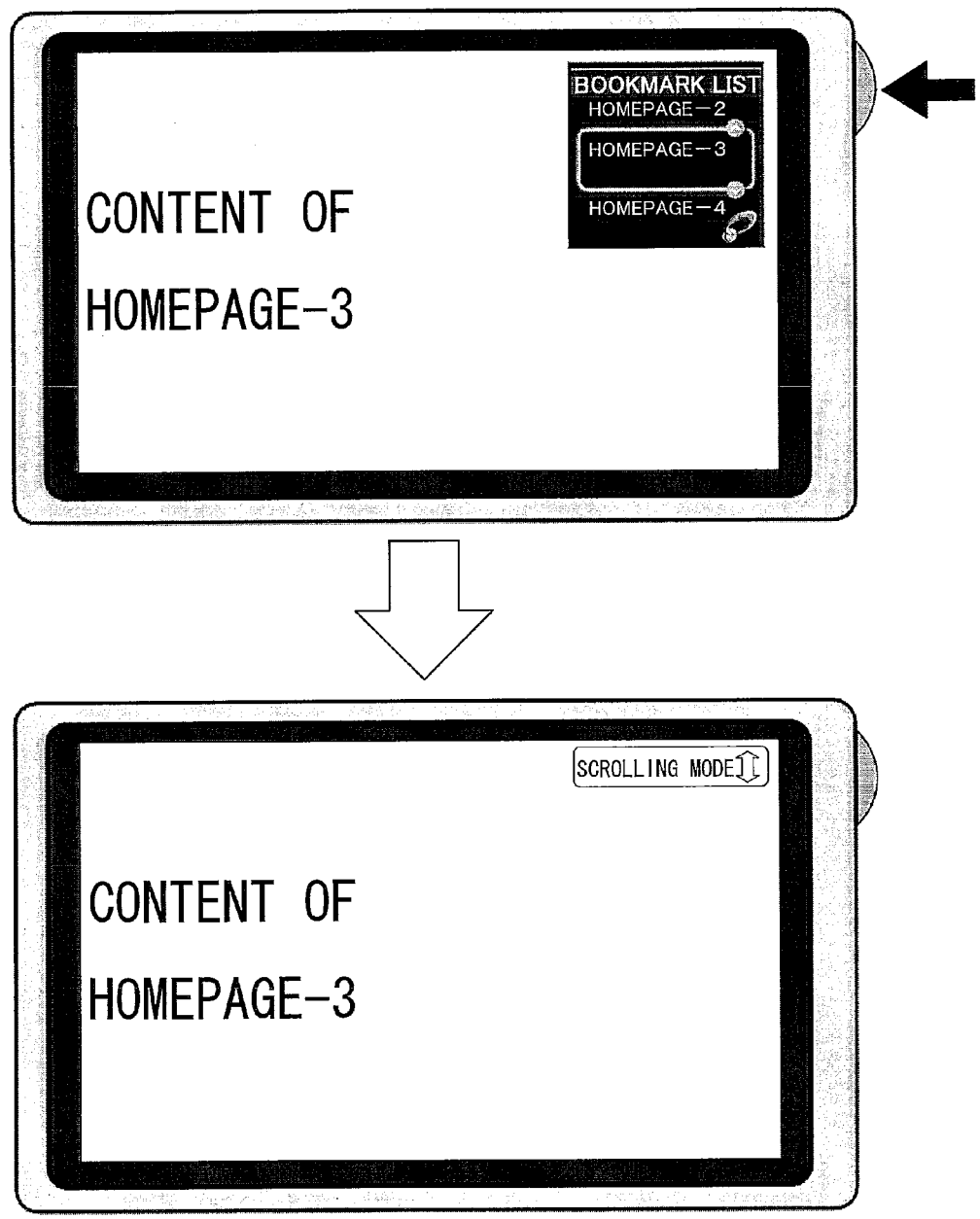
Figure 2:
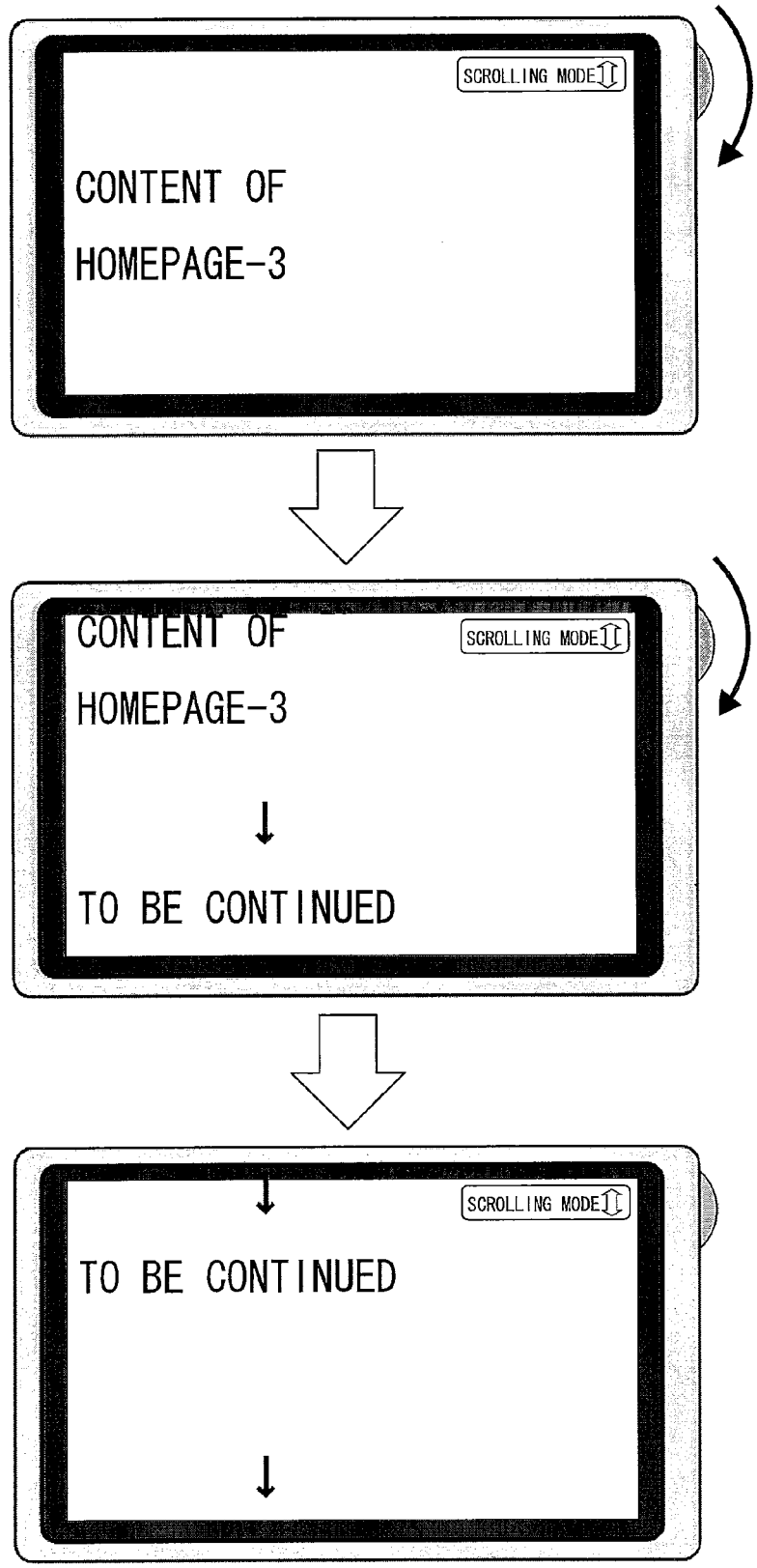

When the operation instruction receiving section 70*d* (content switching instruction receiving means, display range switching instruction receiving means, control switching instruction receiving means) is such a rotatable wheel 4 as shown in FIG. 2 or FIG. 8(*a*) and able to be pushed in toward the main body of the content display device 1*d* in a direction perpendicular to its axis of rotation, such a push operation may serve as a mode switching operation.

Further, when the content display device 1*d* already includes a touch panel on the screen 2, instead of being newly provided with the control switching button 7, the mode switching operation may be performed in the form of an operation of touching a predetermined place on the touch panel.

When the touch panel is used, an area on the touch panel may be divided so that an operation of touching an area other than an area where a content list window is displayed will be recognized as a mode switching instruction. Alternatively, the touch area on the screen 2 may be divided into an area for switching to the content switching mode and an area for switching to the scrolling mode.

Furthermore, it is possible to switch between the modes automatically after a predetermined period without input from the user. Alternatively, it is possible to switch between the modes automatically in accordance with a content item being displayed. For example, it is possible to switch between the modes automatically when the content item being displayed does not fit into a single screen.

It should be noted that that when in the scrolling mode the display range reaches an edge of the content item and then an instruction to move the display range farther than the edge is inputted, the scrolling mode may be switched to the content switching mode in response to the instruction as a trigger. For example, in this arrangement, when a web page is scrolled to its bottom edge and then an instruction to scroll the page farther than the bottom edge is inputted, the next content item in the content list will be displayed. Similarly, when a web page is scrolled to its top edge and then an instruction to scroll the page farther than the top edge is inputted, the previous content item in the content list will be displayed.

<Display of a Mode on the Screen>

The current operation mode can be displayed on the screen 2 in order to notify the user whether the content display device is currently in the content switching mode or the scrolling mode.

The display of the current operation mode on the screen 2 allows the user to know whether the content item will be switched or scrolled when the user performs input on the operation instruction receiving section 70*d*.

The arrangement in which the current operation mode is displayed on the screen 2 is not illustrated below, because the arrangement is similar in function block diagram to the arrangement, shown in FIG. 4 in Embodiment 1, in which the content list window 3 is displayed on the screen 2. The content list display section 90 generates a display corresponding to the current operation mode, and displays it on the screen 2 via the display section 60.

Figure 13:
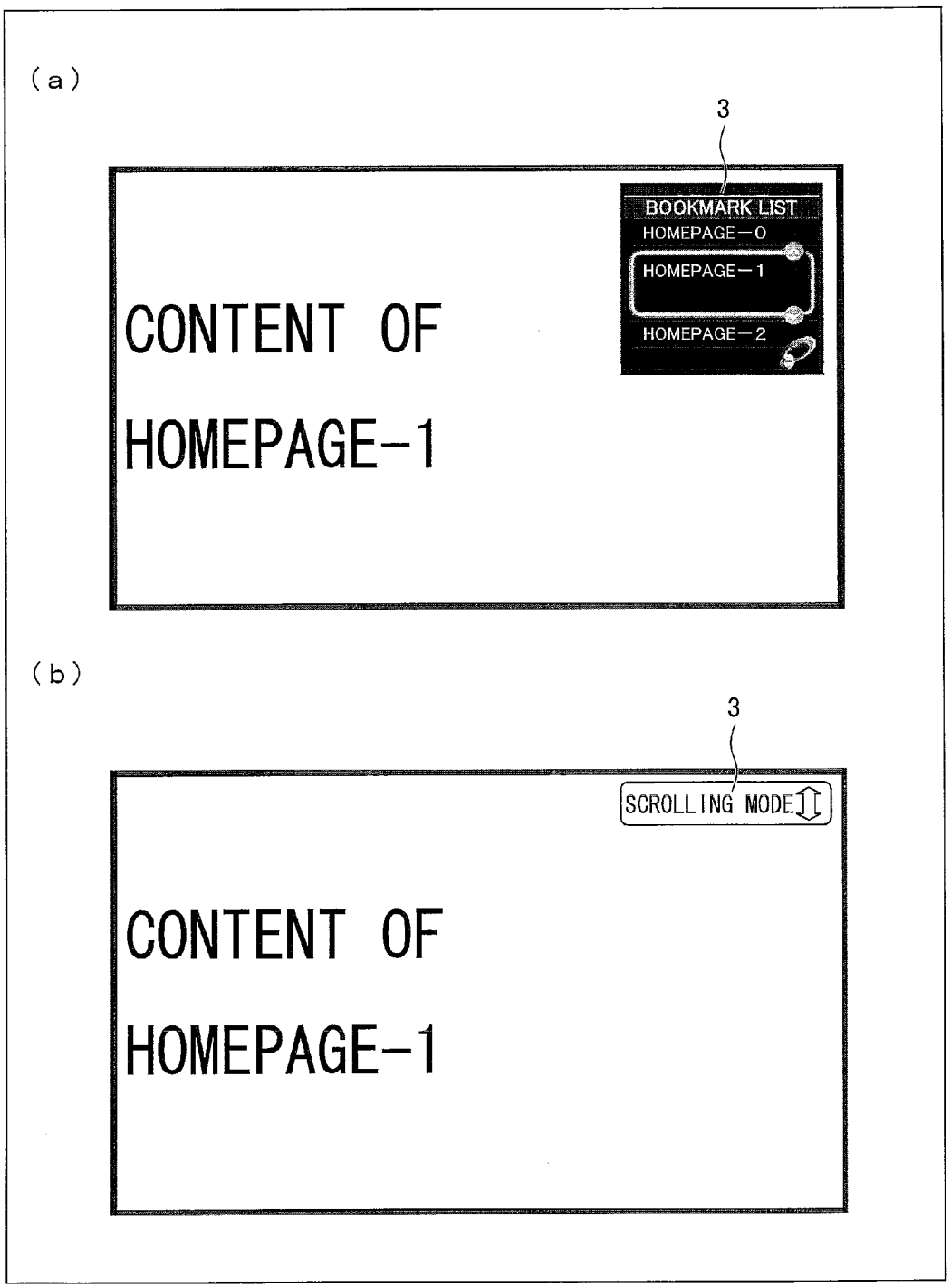
FIG. 13, showing Embodiment 2 of the present invention, shows examples of a screen where the current operation mode is displayed, i.e., (a) an example of a screen showing that the current operation mode is a content switching mode and (b) an example of a screen showing that the current operation mode is a scrolling mode.

FIG. 13 shows examples of a screen where the current operation mode is displayed.

(a) of FIG. 13 is an example of a screen showing that the current operation mode is the content switching mode. In this example, the screen 2 has a content list window 3 displayed on the upper right thereof. The content list window 3 has three content names displayed therein. It should be noted that in this example, the display of the content list window 3, in which the content names are displayed one below the other, shows that the operation mode is the content switching mode. However, the operation mode can be indicated by an operation mode icon other than the display of the content list window 3.

(b) of FIG. 13 is an example of a screen showing that the current operation mode is the scrolling mode. In this example, the screen 2 has a content list window 3 displayed on the upper right thereof. The content list window 3 has a character string "SCROLLING MODE" displayed to indicate that the current operation mode is the scrolling mode. It should be noted that in order to indicate that the current operation mode is the scrolling mode, it is possible to delete the content list window 3 from the screen 2 or change the display in the content list window 3 to a display different from that in the content switching mode. An example of changing to a different display is to change from displaying a plurality of content names in the content list window 3 to displaying only the content name of the currently displayed content item.

<Display of an Operation Mode by a Light-Emitting Section>

The operation mode may be displayed by using a notification method through emission of light by a light-emitting section provided on the content display device, as well as by displaying the content list window 3 or the like on the screen 2.

Figure 14:
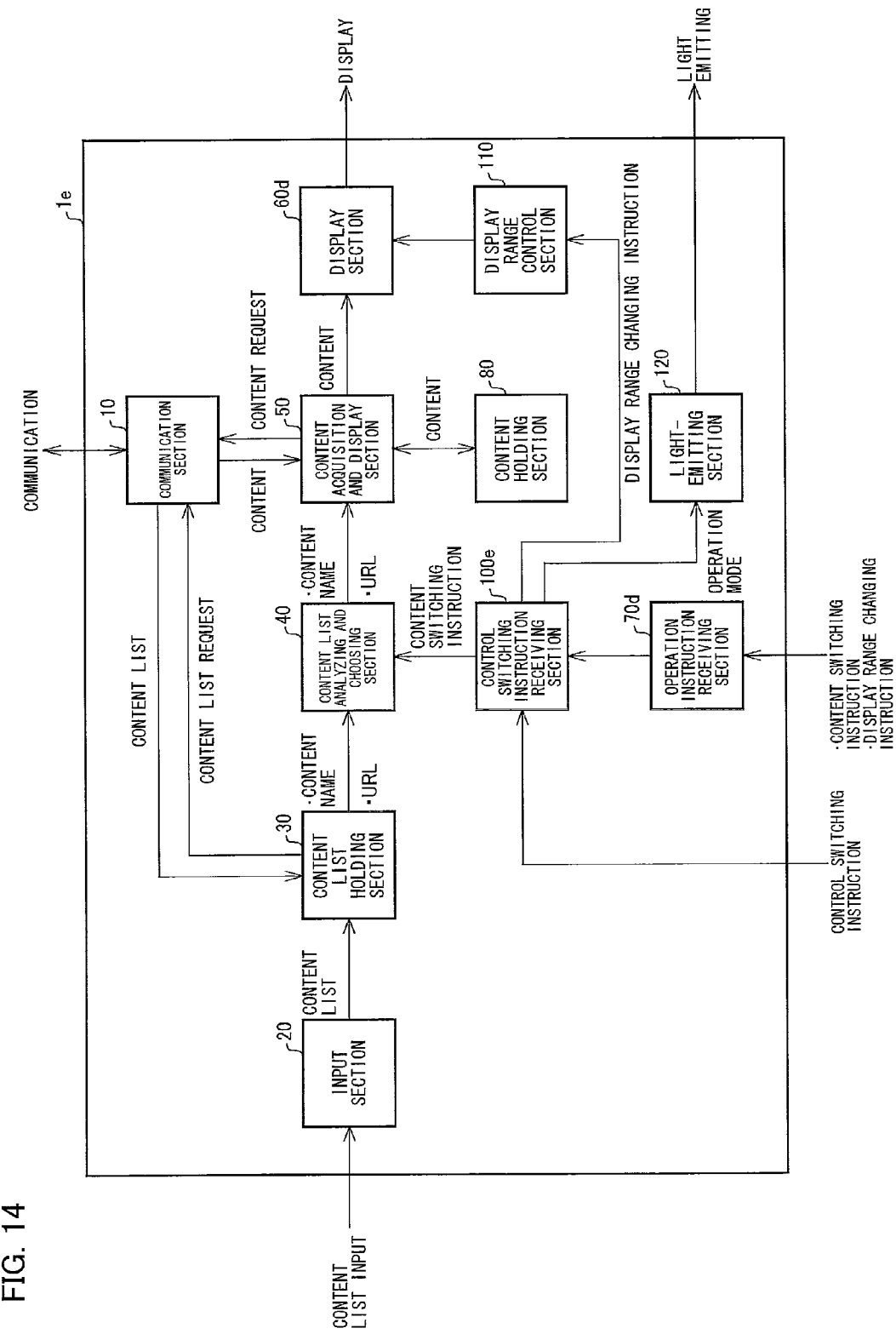
FIG. 14, showing Embodiment 2 of the present invention, is a functional block diagram showing an arrangement of a main part of a content display device including a light-emitting section.

FIG. 14 is a functional block diagram showing a content display device 1*e* including a light-emitting section (light-emitting means) 120. The light-emitting section 120 acquires, from a control switching instruction receiving section 100*e*, information as to which operation mode is currently being used, and performs light-emitting control and emits light. The content display device 1*e* is arranged in the same manner as the content display device 1*d* except that the content display device 1*e* is provided with the light-emitting section 120.

Figure 15:
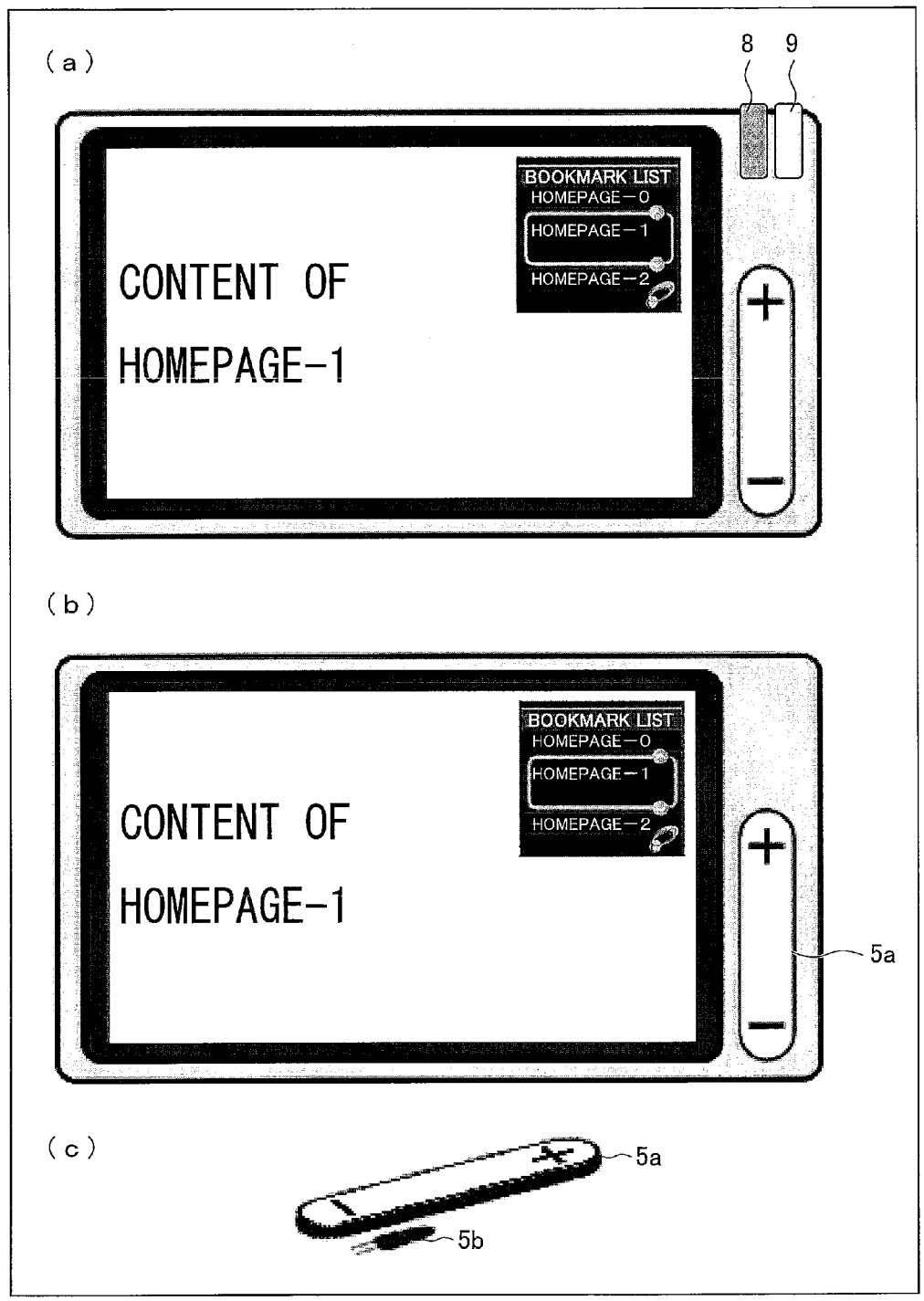
FIG. 15, showing Embodiment 2 of the present invention, shows examples of notification of an operation mode by the light-emitting section 120, i.e., shows (a) an example where the light-emitting section is constituted by two LEDs, (b) an example of a switch serving concurrently as the control instruction receiving section, the control switching instruction receiving section, and the light-emitting section, and (c) how the switch is positioned in relation to a light-emitting section.

FIG. 15 shows examples of notification of an operation mode by the light-emitting section 120. (a) of FIG. 15 shows an example where the light-emitting section 120 is constituted by an LED 8 and an LED 9. When the current operation mode is the content switching mode, the LED 8 emits light, and when the current operation mode is the scrolling mode, the LED 9 emits light. It should be noted that the light-emitting section 120 may be a single LED that varies in color of emitted light to present the operation modes in distinction from each other.

(b) of FIG. 15 shows an example of a switch 5*a* serving concurrently as the operation instruction receiving section 70*d*, the control switching instruction receiving section 100*e*, and the light-emitting section 120. This arrangement enables the user to see the current operation mode easily in operating the switch 5*a*.

(c) of FIG. 15 shows a detailed example of the arrangement shown in (b) of FIG. 15. In this example, the switch 5*a* is transparent or translucent, and has a LED 5*b* provided thereunder so that the color of light emitted by the LED 5*b* can be seen by the user through the switch 5*a*. The switch 5*a* may be an electrostatic pad, a trackball, or a button. The LED 5*b* may be provided on a surface of the switch 5*a*.

<Use of Multiple Colors of Emitted Light>

The light-emitting section 120 may be arranged, with use of a light-emitting device capable of displaying multiple colors, to vary in color of emitted light to indicate the source of the currently displayed content item, the type of content item, or the status of the content display device.

Figure 16:
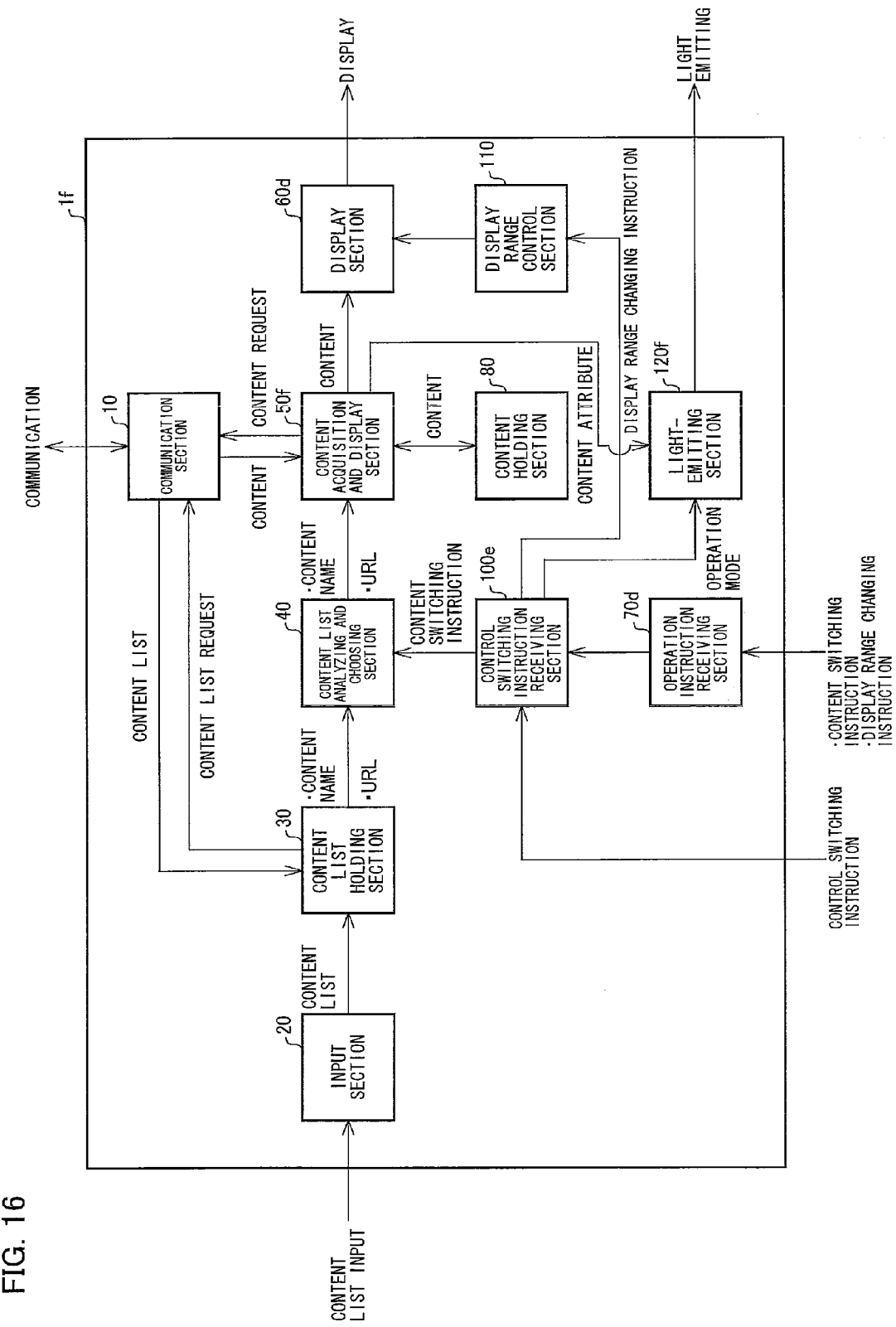
FIG. 16, showing Embodiment 2 of the present invention, is a functional block diagram showing an arrangement of a main part of a content display device including a light-emitting section that varies in color of emitted light according to the type of content item that is displayed.
Figure 17:
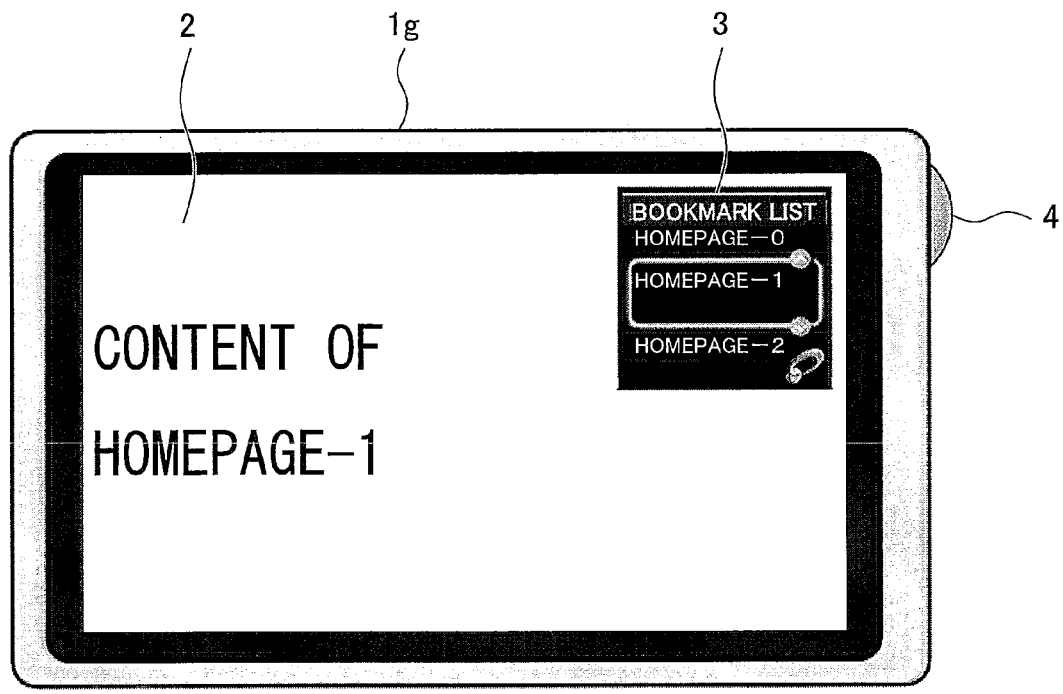
FIG. 17(a), showing Embodiment 2 of the present invention, shows an example of operation of a portable content display device including a touch panel on the screen, which is at the start of a process.
FIG. 17(b), showing Embodiment 2 of the present invention, shows an example of operation of the portable content display device including a touch panel on the screen and a transition from one screen to another that is made by operating a wheel in a content switching mode.
FIG. 17(c), showing Embodiment 2 of the present invention, shows an example of operation of the portable content display device including a touch panel on the screen, an example of an operation for switching from one operation mode to another, and an example of a transition from one screen to another.
FIG. 17(d), showing Embodiment 2 of the present invention, shows an example of operation of the portable content display device including a touch panel on the screen and a transition from one screen to another that is made by operating the wheel in a scrolling mode.
FIG. 17(e), showing Embodiment 2 of the present invention, shows an example of operation of the portable content display device including a touch panel on the screen, i.e., shows an example of a screen displaying a content list.
Figure 17:
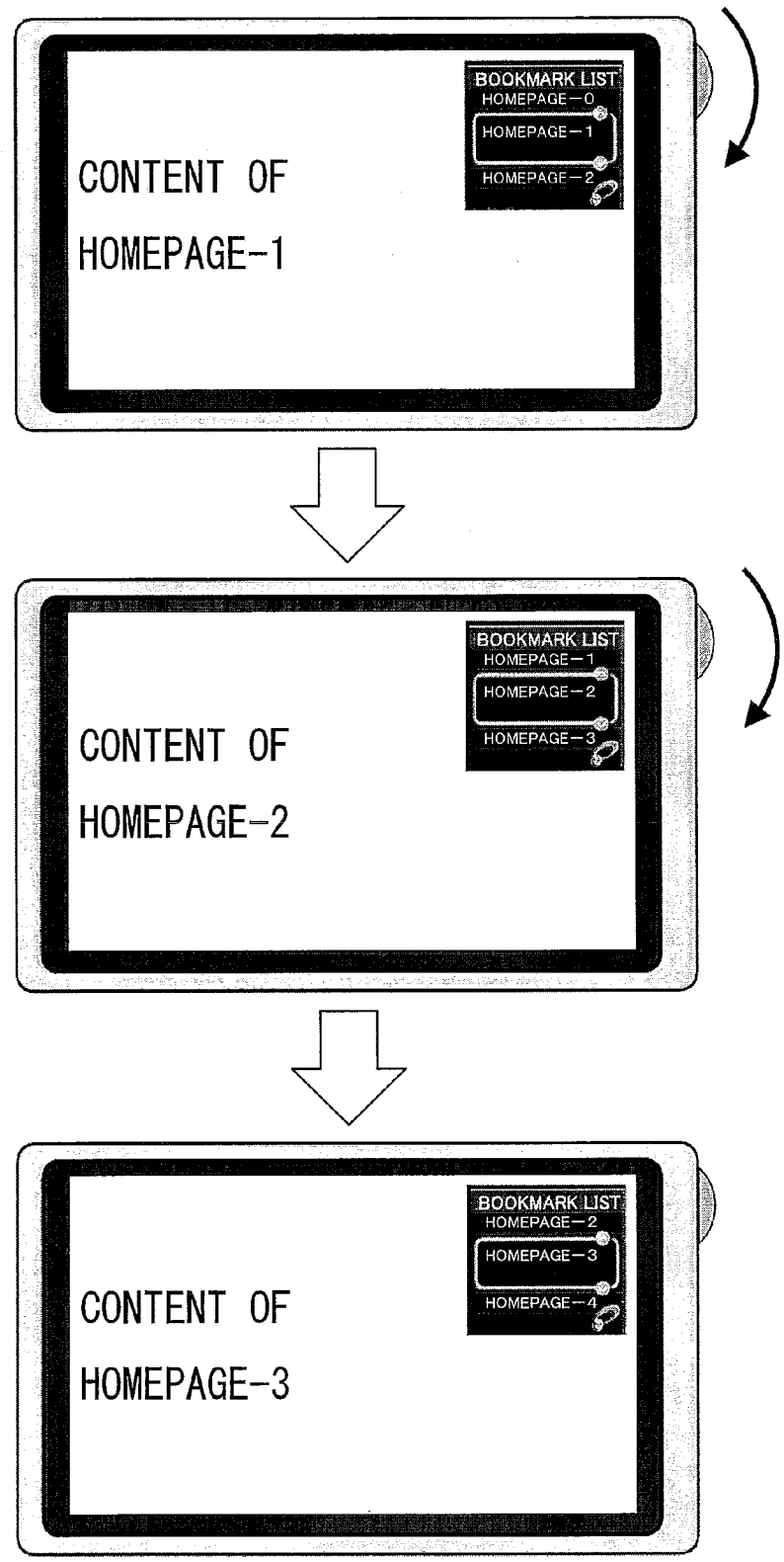
Figure 17:
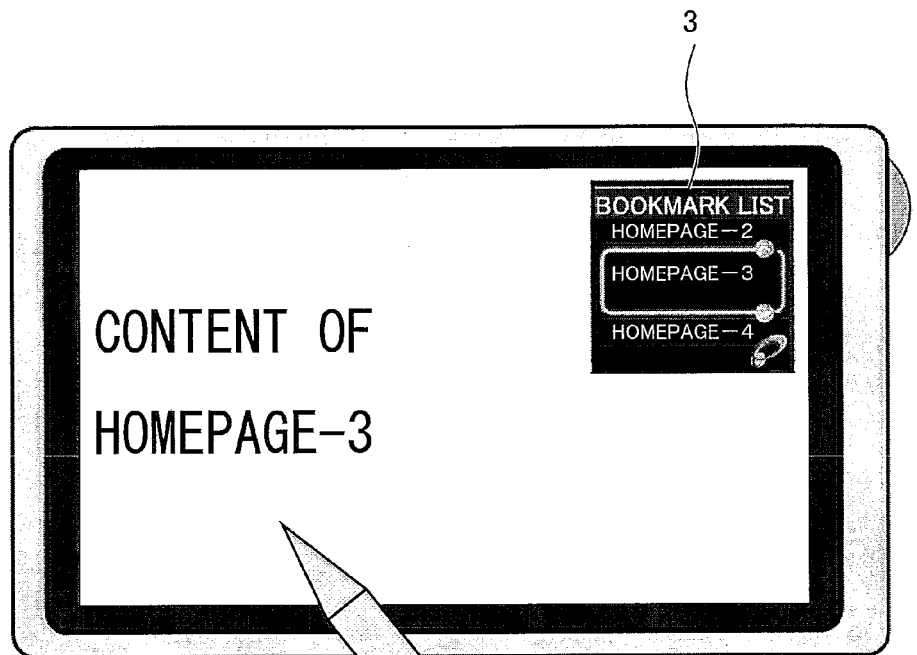
Figure 17:
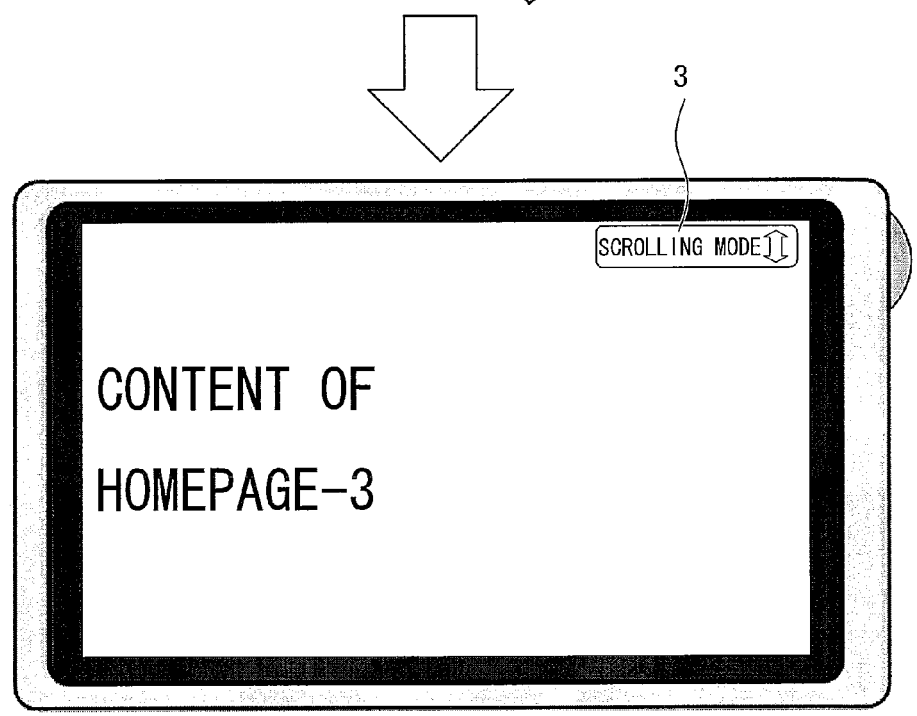
Figure 17:
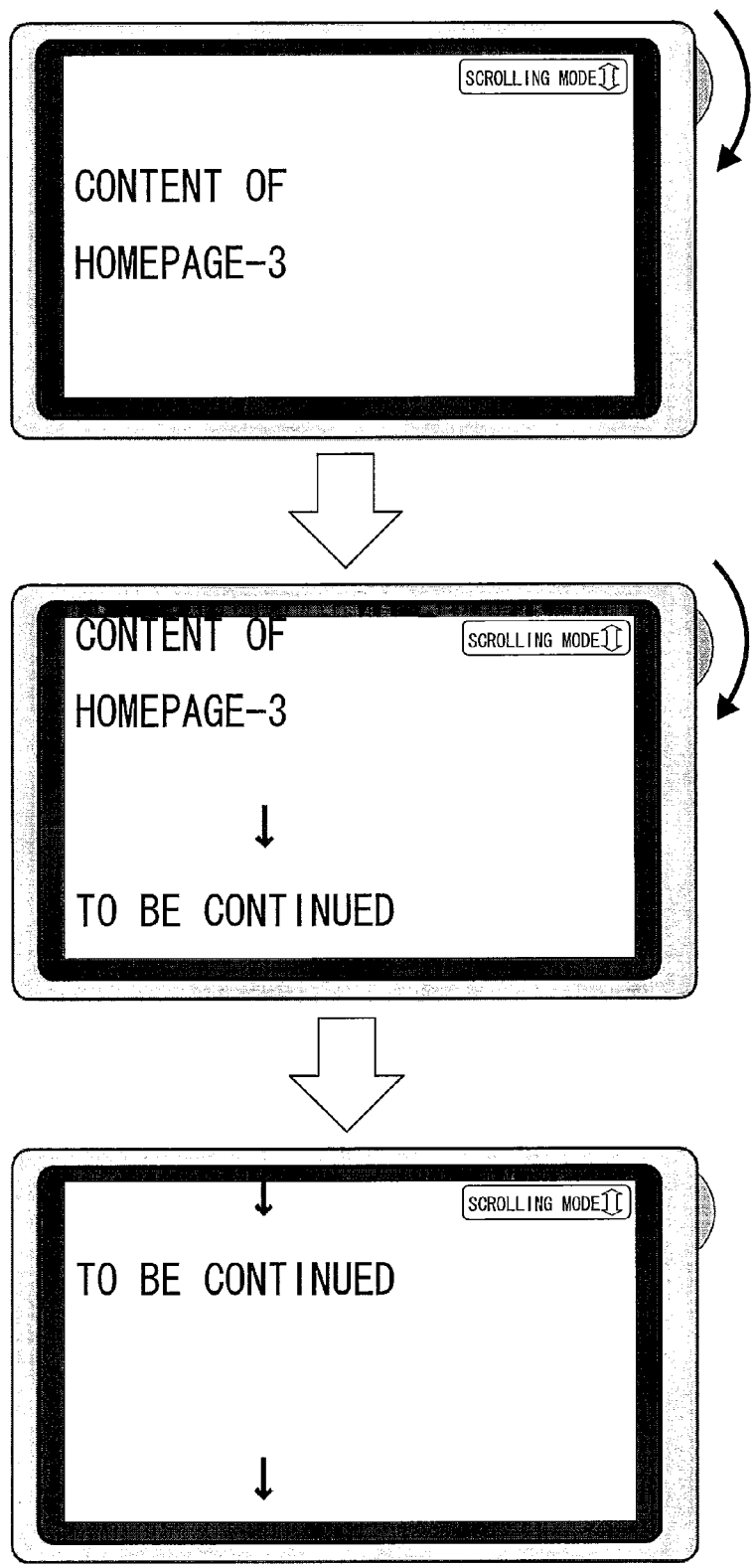
Figure 17:
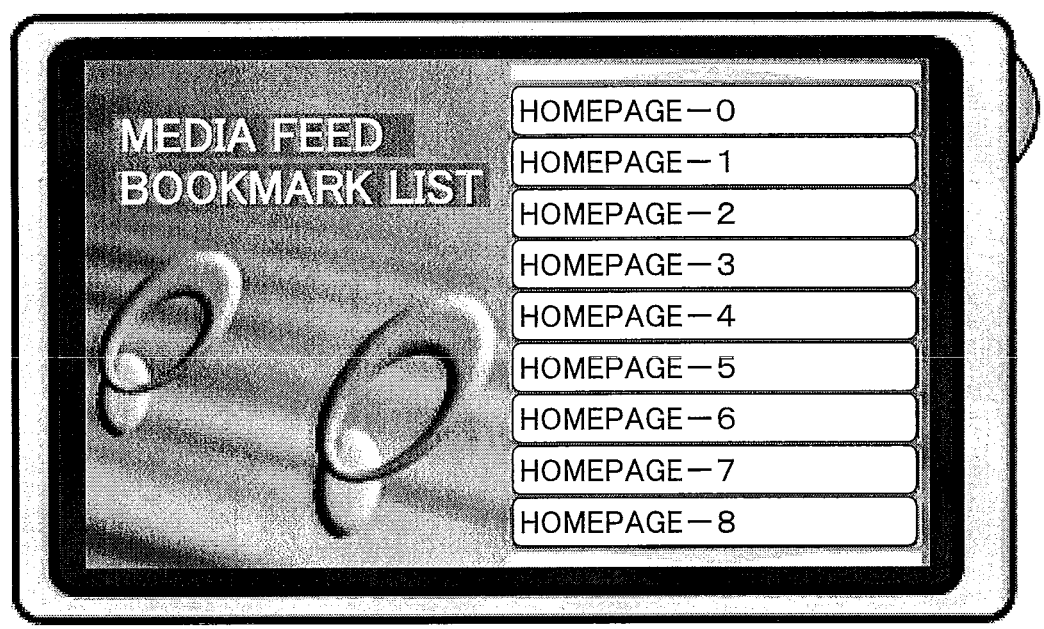

FIG. 16 is a functional block diagram of a content display device 1*f* so arranged. The functional blocks per se are the same as those of the content display device 1e. However, the content display device 1f is different form the content display device 1e in that a light-emitting section 120f acquires attribute information of the currently displayed content item from a content acquisition and display section 50f, in addition to acquiring, from the control switching instruction receiving section 100e, the information as to which operation mode is currently being used. The light-emitting section (light-emitting means) 120f varies in color of emitted light according to the operation mode and the attribute information of the content item.

For example, the light-emitting section 120f emits blue light when the currently displayed content item indicates a function of the content display device 1f, emits green light when the currently displayed content item is a menu screen, and emits red light when the currently displayed content item is a content item acquired from the Internet. For another example, the light-emitting section 120f emits blue light when the currently displayed content item is an animated content item, emits green light when the currently displayed content item is a still image, the light-emitting section 120f emits red light when the currently displayed content item is news.

Furthermore, it is possible to combine the operation mode display, thereby blinking or turning off the LED in the scrolling mode, in addition to the aforementioned variations in color of emitted light.

The attribute of a content item may be determined by an HTML tag, a plug-in for use in reproduction of the content item, or a decoder. Alternatively, the attribute of a content item may be determined by a file, provided separately in a server, in which the attribute of the content item is described.

<Display of an Operation Mode by Music or Sound>

Further, it is possible to replace the light emitting section with an audio output section (reproduced-music changing means) to indicate the operation mode, the source of the currently displayed content item, the type of content item, or the status of the content display device by outputting sound, voice, or music. Note that the audio output section can change from playback of one piece of music (BGM) to playback of another according to at least either the source or attribute of the currently displayed content item.

<Slide-Show Button>

It is possible to provide the slide-show button 6 of FIG. 9 as in the case of Embodiment 1. The function and operation of the slide-show button 6 are as described above.

<Screen Display of a Content Item Created by a Program>

The foregoing describes a display of a content item that has been created in advance. However, the technique according to the present invention is not limited to this, and as such, can process, as a content item, a screen generated by a general application program in response to a processing instruction from the user.

In this case, (i) a content display program for performing screen displays such as mail management, browsers, menu management, and the like and (ii) a content control program for performing content switching control by the above-described control method are separated from each other.

In response to input from the user, the content control program chooses, in accordance with the above-described content control method, a content item that is to be displayed, and transfers the control to the content display program. The content display program functions as the content acquisition display section 50. After completion of display processing by the content display program, the content display program notifies the content control program of the completion of the control in order to acquire the input from the user. As for the transfer of the control to the content control program, the content control program may perform an operation of regaining the control after a timer operation of measuring a predetermined period of time.

Operation Example 2

Browsing Internet Content

FIGS. 17(a) through 17(d) show, as examples of operation of a content display device according to the present invention, examples of operation of a portable content display device 1g including a touch panel on the screen 2.

FIG. 17(a) shows the appearance of the content display device 1g. On the screen 2 of the content display device 1g, a web page on the Internet is being displayed as a content item. On the upper right of the screen 2, a part of a content list is being displayed as a content list window 3. A wheel 4 is rotated to perform operations in the content switching mode and the scrolling mode. Further, a touch operation of touching the touch panel is performed to switch between the scrolling mode and the content switching mode.

FIG. 17(a) shows a screen at the start of a process. At the start of a process in the first activation of the content display device 1g, the content display device 1g displays a content item that is at the top of the content list. At the start of a process in the second or subsequent activation, the content display device 1g displays a content item displayed at the time of the previous termination. Information about which content item was displayed at the time of the previous termination is held in the content list holding section 30 or the content list analyzing and choosing section 40.

FIG. 17(b) shows a transition from one screen to another that is made by operating the wheel 4 in the content switching mode. A downward (clockwise) rotation of the wheel 4 (i.e. operation instruction receiving section 70) allows a sequential display of content items written in the content list.

FIG. 17(c) shows an example of an operation for switching from one operation mode to another, and an example of a transition from one screen to another. A touch of a pen or the like on the touch panel causes a switch from the content switching mode to the scrolling mode. A change in display in the content list window allows the user to see the switch in operation mode.

FIG. 17(d) shows a transition from one screen to another that is made by operating the wheel 4 in the scrolling mode. A downward (clockwise) rotation of the wheel 4 allows scrolling of the currently displayed content item.

FIG. 17(e) shows an example of a screen displaying a content list. An operating section may be provided separately to display the content list.

As described above, the use of operation instruction receiving section 70 allows the user to instinctively perform a series of operations from choosing a content item to browsing the content item.

Operation Example 3

Application to a Menu Screen

Figure 18:
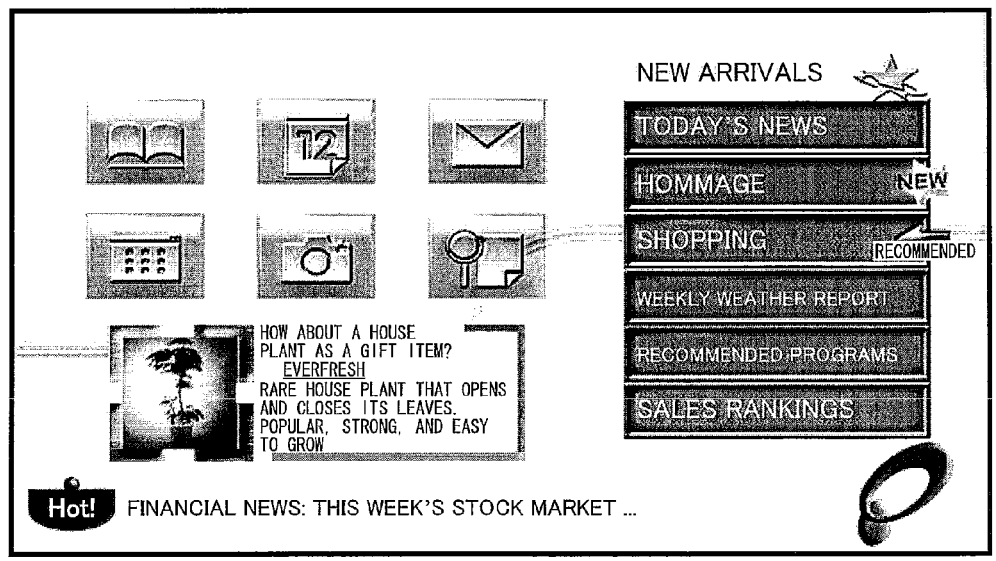
FIG. 18(a) shows an operation for a menu screen of a content display device according to the present invention, i.e., shows an example of a menu screen containing Internet service information.
FIG. 18(b) shows an operation for a menu screen of a content display device according to the present invention, i.e., an example of a menu screen for starting up applications.
FIG. 18(c) shows an operation for a menu screen of a content display device according to the present invention, i.e., shows an example of a menu screen containing schedule information.
FIG. 18(d) shows an operation for a menu screen of a content display device according to the present invention, i.e., shows an example where a transition from one screen to another in sequence is made by touching that portion of an electrostatic pad which is marked with "−".
FIG. 18(e) shows an operation for a menu screen of a content display device according to the present invention, i.e., shows an example where a transition in screen from a content (menu) switching mode to a scrolling mode is made by pressing a button.
Figure 18:
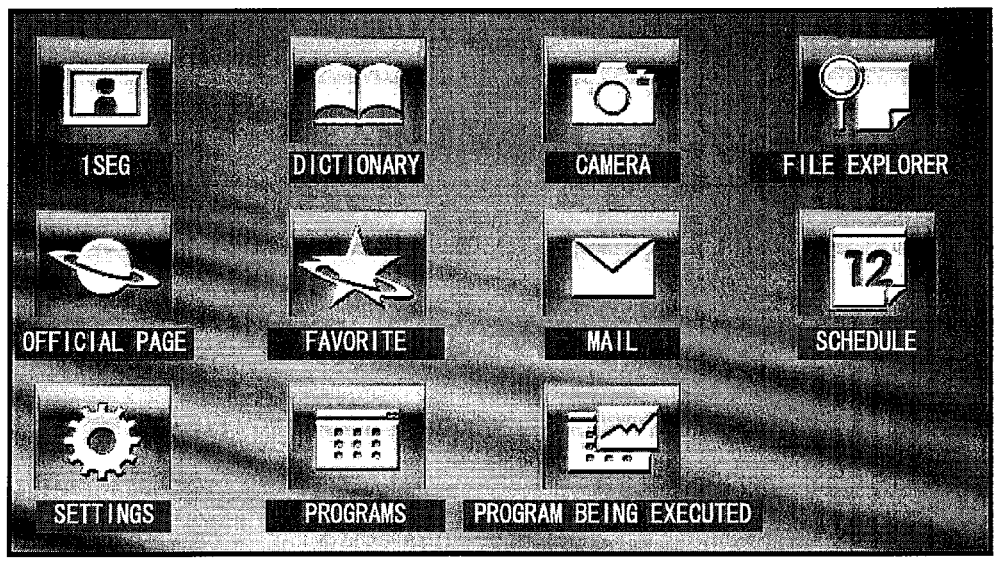
Figure 18:
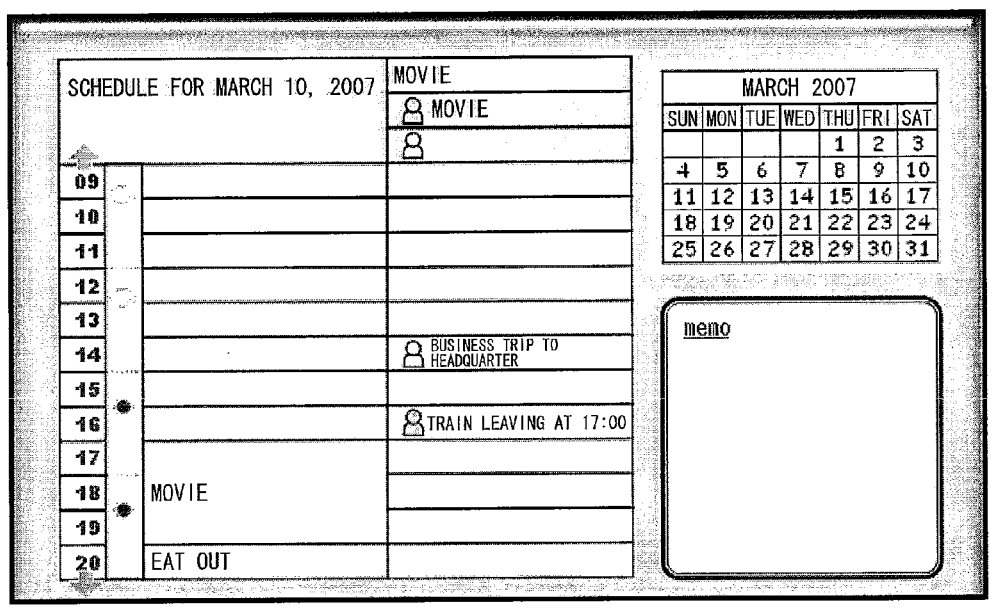
Figure 18:
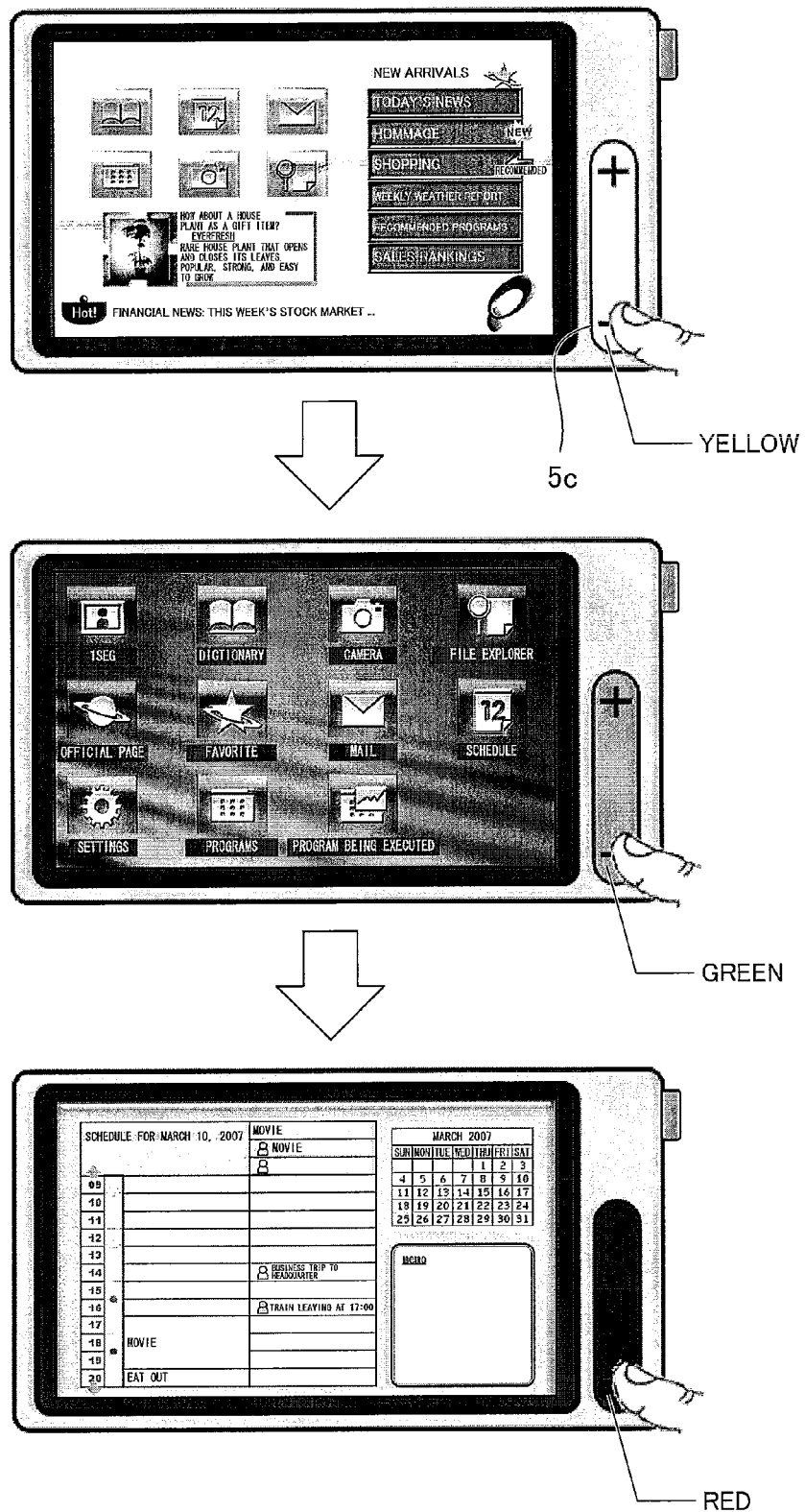
Figure 18:
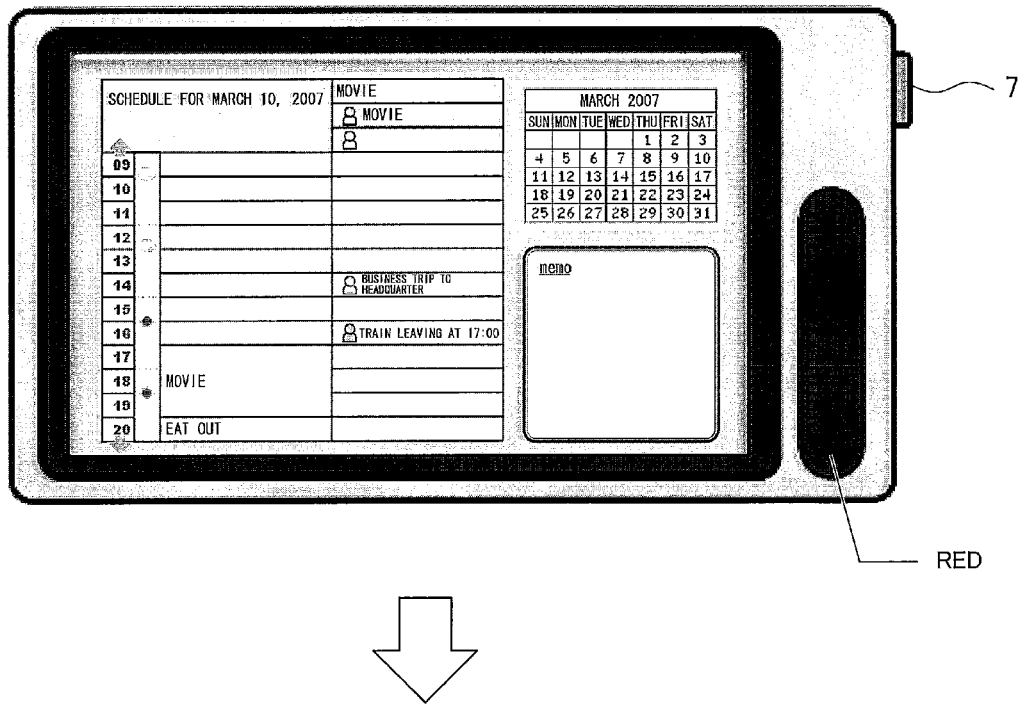
Figure 18:
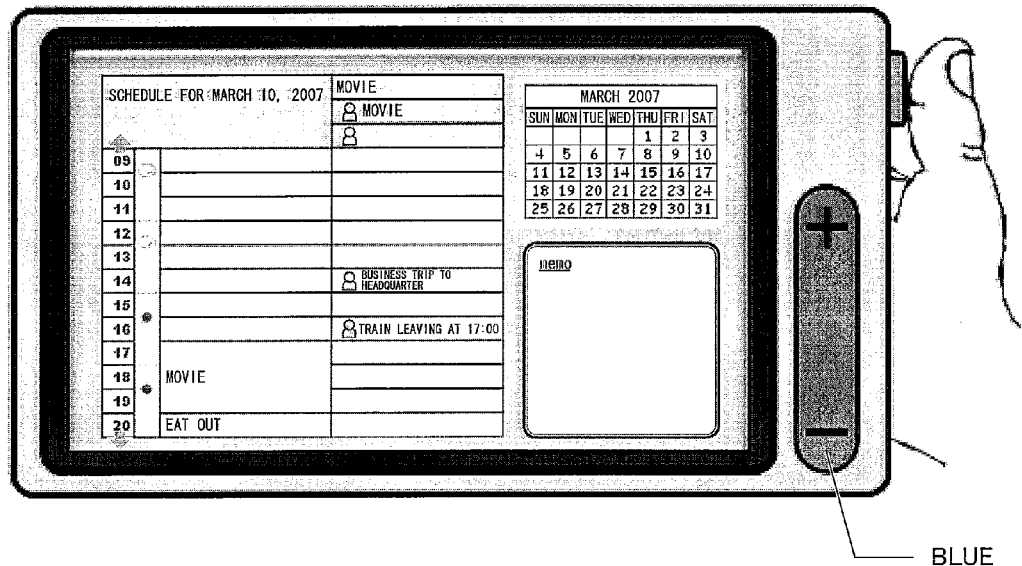

FIG. 18 shows an operation for a menu screen as another operation example. This example treats a menu screen as a content item. It should be noted that the operation instruction receiving section 70 takes the form of an electrostatic pad 5c, provided on the front of a content display device 1h, which includes a light-emitting section 120, and that the control receiving switching section 100 takes the form of a button 7 provided on a side face of the content display device 1h.

FIG. 18(a) shows an example of a menu screen containing Internet service information. FIG. 18(b) shows an example of a menu screen for starting up applications. FIG. 18(c) shows an example of a menu screen containing schedule information. A plurality of menu screens are provided according to their uses.

FIG. 18(d) shows an example where a transition from one screen to another in sequence is made by touching that portion of the electrostatic pad 5c which is marked with "−".

FIG. 18(e) shows an example where a transition in screen from a content (menu) switching mode to a scrolling mode is made by pressing the button 7. In the example, a change in operation mode is indicated by a change in color of the switch 5 from red to blue.

Although in the example the button 7, which serves as the control switching instruction receiving section 100, is provided separately from the electrostatic pad 5c, the button 7 may be replaced by a touch on the middle portion of the electrostatic pad 5c.

Moreover, as another method for inputting operations, the control switching instruction receiving section 100 may be arranged so as to interpret a touch of the user on the upper or lower end "+" or "−" of the electrostatic pad 5c as a content switching instruction and interpret a downward or upward stroke of the user over the electrostatic pad 5c as a scrolling instruction.

<Scrolling Range>

The content display device 1h may be arranged such that an operation of the electrostatic pad 5c in the scrolling mode causes scrolling of only a particular display range. In the example of FIG. 18(a), only the section displaying a list of Internet services is scrolled. In the example of FIG. 18(c) or 18(e), only the schedule section of the scheduler screen is scrolled.

<Supplementary Information>

The present invention is not limited to the description of the embodiments above, but may be altered by a skilled person within the scope of the claims. An embodiment based on a proper combination of technical means disclosed in different embodiments is encompassed in the technical scope of the present invention.

Finally, the blocks of the content display device 1 and 1a to 1h or, in particular, the content list analyzing and choosing sections 40 and 40b and the content acquisition and display section 50, 50c, and 50f may be realized by way of hardware or software as executed by a CPU as follows:

The content display device 1 and 1a to 1h each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the content display device 1 and 1a to 1h a computer-readable storage medium containing control program code (executable program, intermediate code program, or source program) for the content display device 1 and 1a to 1h, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The content display device 1 and 1a to 1h may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

A content display device according to the present invention includes: content switching instruction receiving means for receiving, by a user's operation, a switching instruction to switch the content items; content choosing means for, based on an order prescribed in a content list, choosing a content item that is displayed on the screen, in accordance with the switching instruction received by the content switching instruction receiving means; and content display means for causing the content item chosen by the content choosing means to be displayed on the screen.

A content display method according to the present invention includes: a content switching instruction receiving step in which content switching instruction receiving means receives, from a user, a switching instruction to switch the content items; a content choosing step in which content choosing means chooses, based on an order prescribed in a content list, a content item that is displayed on the screen, in accordance with the switching instruction received by the content switching instruction receiving means; and a content display step in which content display means causes the content item chosen by the content choosing means to be displayed on the screen.

This eliminates the need for a user to transfer his/her gaze to see and operate content switching instruction receiving means in giving a content switching instruction, thus bringing about an effect of enabling an improvement in the operationality of the content display device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A content display device according to the present invention makes it unnecessary for a user to transfer his/her gaze to see and operate content switching instruction receiving means in giving a content switching instruction, whereby the operationality of the content display device can be improved. As such, the content display device according to the present invention can be applied in cases where it is necessary to improve operationality by reducing the transfer of a user's gaze.

The invention claimed is:

1. A content display device for displaying content items on a screen and configured to operate in a scrolling mode and a content switching mode, the display device comprising:
   a monitor to display content;
   a content switching instruction receiving section for receiving, by a user's operation, a switching instruction to switch a content item currently displayed on a content display area of the screen to a previous content item or to a next content item;
   a content choosing section for, based on an order prescribed in a content list containing identifiers of respective content items to be displayed on a content list area of the screen and descriptors of locations holding the respective content items to be displayed on the content display area of the screen, choosing the previous content item which precedes the content item currently displayed on the content display area of the screen or the next content item which follows the content item currently displayed on the content display area of the screen, in accordance with the switching instruction received by the content switching instruction receiving section;
   a content display section for causing the content item, which is specified by a corresponding one of the descriptors of locations holding the content items and chosen by the content choosing section, to be displayed on the content display area of the screen; and
   a content list display section for displaying, on the content list area of the screen, identifiers contained in the content list, the identifiers being (i) an identifier of the content item currently displayed and (ii) identifiers, of content items that may be displayed after the content item currently displayed, which are provided above and below the identifier of the content item currently displayed, wherein
   the content list area overlaps a subset of the content display area when the display device is in the content switching mode, and
   the content list area is not displayed on the screen and the content chosen by the content choosing section scrolls within the content display area in response to the user's operation when the display device is in the scrolling mode.

2. The content display device as set forth in claim 1, wherein the prescribed order is an order in which the entries are written.

3. The content display device as set forth in claim 1, further comprising a content list acquiring section for acquiring the content list from an external storage device in which the content list has been stored.

4. The content display device as set forth in claim 1, further comprising:
   a communication section for communicating with an external device; and
   a content list acquiring section for acquiring the content list from the external device via the communication section.

5. The content display device as set forth in claim 1, further comprising:
   a communication section for communicating with an external device, wherein
   the content display section acquires, from an external device via the communication section, the content item chosen by the content choosing section.

6. The content display device as set forth in claim 5, wherein in accordance with an order in which the content items are written in the content list and information on which of the content items in the content list is currently being displayed, the content display device acquires, in advance before the content switching instruction receiving section receives a next switching instruction from the user, a content item that is chosen by the content choosing section when the content switching instruction receiving section receives the next switching instruction.

7. The content display device as set forth in claim 1, wherein in displaying at least a part of the identifiers of the content items in the content list on the screen, the content list display section displays an identifier of a content item that has been acquired, together with an icon indicating completion of the acquisition.

8. The content display device as set forth in claim 1, wherein after a certain period of time has elapsed since the content list display section displayed the content list or in accordance with input from the user, the content list display section changes from displaying the content list to displaying a title of the currently displayed content item.

9. The content display device as set forth in claim 1, further comprising slide-show mode setting section for receiving from the user an instruction to switch to a slide-show mode in which to change, at predetermined time intervals, from displaying one content item written in the content list to displaying another, wherein
   while the slide-show mode is being used, the content display section changes, at the predetermined time intervals, from displaying one content item written in the content list to displaying another, without an instruction from the content switching instruction receiving section.

10. The content display device as set forth in claim 1, further comprising:
    a display range changing instruction receiving section for receiving, from the user, a display range changing instruction to change a display range of a content item;
    a display range control section for controlling, in accordance with a display range changing instruction received by the display range changing instruction receiving section, a display range of a currently displayed content item; and
    a control switching instruction receiving section for receiving a control switching instruction as to whether to switch an operation mode of the content display device to the scrolling mode in which to control the display range of the currently displayed content item or the content switching mode in which to control choice of the entries in the content list, wherein:
    the content switching instruction receiving section and the content display range changing instruction receiving section interact with each other;
    in the scrolling mode, the control switching instruction receiving section sends, to the display range control section, input from the content display range changing instruction receiving section; and
    in the content switching mode, the control switching instruction receiving section sends, to the content choosing section, input from the content switching instruction receiving section.

11. The content display device as set forth in claim 10, wherein the display range control section changes, in accordance with contents of the currently displayed content item, a way in which the display range is controlled.

12. The content display device as set forth in claim 10, wherein the control switching instruction receiving section is input from a touch sensor provided on the screen.

13. The content display device as set forth in claim 10, further comprising light-emitting section that varies in color of emitted light according to at least either a source or an attribute of the currently displayed content item.

14. The content display device as set forth in claim 1, wherein:
the content choosing section and the content display section are controlled by separate application programs; and
while the switching instruction to switch the content items is controlled by the application program corresponding to the content choosing section, scrolling of the content items is controlled by the application program corresponding to the content display section.

15. A content display device for displaying content items on a screen, comprising:
a monitor to display content;
a content switching instruction receiving section for receiving, by a user's operation, a switching instruction to switch a content item currently displayed on the screen to a previous content item or to a next content item;
a content choosing section for, based on an order prescribed in a content list containing identifiers of respective content items to be displayed on the screen and descriptors of locations holding the respective content items to be displayed on the screen, choosing the previous content item which precedes the content item currently displayed on the screen or the next content item which follows the content item currently displayed on the screen, in accordance with the switching instruction received by the content switching instruction receiving section;
a content display section for causing the content item, which is specified by a corresponding one of the descriptors of locations holding the content items and chosen by the content choosing section, to be displayed on the screen;
a content list display section for displaying, on the screen, identifiers contained in the content list, the identifiers being (i) an identifier of the content item currently displayed and (ii) identifiers, of content items that may be displayed after the content item currently displayed, which are provided above and below the identifier of the content item currently displayed;
a display range changing instruction receiving section for receiving, from the user, a display range changing instruction to change a display range of a content item;
a display range control section for controlling, in accordance with a display range changing instruction received by the display range changing instruction receiving section, a display range of a currently displayed content item; and
a control switching instruction receiving section for receiving a control switching instruction as to whether to switch an operation mode of the content display device to a scrolling mode in which to control the display range of the currently displayed content item or a content switching mode in which to control choice of the entries in the content list,
wherein when in the scrolling mode the display range reaches an edge of the currently displayed content item and then a display range changing instruction to move the display range farther than the edge is inputted, the control switching instruction receiving section switches from the scrolling mode to the content switching mode in response to the display range changing instruction as a trigger.

16. A non-transitory computer-readable storage medium coupled to one or more processors connected to a display device including a screen configured to operate in a scrolling mode and a content switching mode, having instructions stored thereon that, when executed by said one or more processors, causes said one or more processors to perform operations comprising:
a content switching instruction receiving step in which a content switching instruction receiving section receives, from a user, a switching instruction to switch a content item currently displayed on a content display area of the screen to a previous content item or to a next content item;
a content choosing step in which a content choosing section chooses, based on an order prescribed in a content list containing identifiers of respective content items to be displayed on a content list area of the screen and descriptors of locations holding the respective content items to be displayed on the content display area of the screen, the previous content item which precedes the content item currently displayed on the content display area of the screen or the next content item which follows the content item currently displayed on the content display area of the screen, in accordance with the switching instruction received by the content switching instruction receiving section;
a content display step in which a content display section causes the content item, which is specified by a corresponding one of the descriptors of locations holding the content items and chosen by the content choosing section, to be displayed on the content display area of the screen;
a content list display step in which a content list module displays, on the content list area of the screen, identifiers contained in the content list, the identifiers being (i) an identifier of the content item currently displayed and (ii) identifiers, of content items that may be displayed after the content item currently displayed, which are provided above and below the identifier of the content item currently displayed;
overlapping the content list area over a subset of the content display area when the display device is in the content switching mode; and
removing the content list area from the screen and scrolling the content chosen in the content choosing step within the content display area in response to a user's operation when the display device is in the scrolling mode.

17. A content display method for displaying content items on a display device including a screen, configured to operate in a scrolling mode and a content switching mode, the method comprising:
a content switching instruction receiving step in which a content switching instruction receiving section receives, from a user, a switching instruction to switch a content item currently displayed on a content display area of the screen to a previous content item or to a next content item;
a content choosing step in which a content choosing section chooses, based on an order prescribed in a content list containing identifiers of respective content items to be displayed on a content list area of the screen and descriptors of locations holding the respective content items to be displayed on the content display area of the screen, the previous content item which precedes the content item currently displayed on the content display area of the screen or the next content item which follows the content item currently displayed on the content display area of the screen, in accordance with the switching instruction received by the content switching instruction receiving section;

a content display step in which a content display section causes the content item, which is specified by a corresponding one of the descriptors of locations holding the content items and chosen by the content choosing section, to be displayed on the content display area of the screen;

a content list display step in which a content list module displays, on the content list area of the screen, identifiers contained in the content list, the identifiers being (i) an identifier of the content item currently displayed and (ii) identifiers, of content items that may be displayed after the content item currently displayed, which are provided above and below the identifier of the content item currently displayed;

overlapping the content list area over a subset of the content display area when the display device is in the content switching mode; and removing the content list area from the screen and scrolling the content chosen in the content choosing step within the content display area in response to a user's operation when the display device is in the scrolling mode.

* * * * *